United States Patent
Tang et al.

(10) Patent No.: US 11,044,713 B2
(45) Date of Patent: Jun. 22, 2021

(54) TERMINAL DEVICE SCHEDULING METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventors: Hai Tang, Guangdong (CN); Ning Yang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 99 days.

(21) Appl. No.: 16/348,804

(22) PCT Filed: Nov. 11, 2016

(86) PCT No.: PCT/CN2016/105471
§ 371 (c)(1),
(2) Date: May 9, 2019

(87) PCT Pub. No.: WO2018/086064
PCT Pub. Date: May 17, 2018

(65) Prior Publication Data
US 2019/0268886 A1      Aug. 29, 2019

(51) Int. Cl.
*H04W 72/04* (2009.01)
*H04W 72/12* (2009.01)

(52) U.S. Cl.
CPC ....... *H04W 72/042* (2013.01); *H04W 72/044* (2013.01); *H04W 72/1278* (2013.01)

(58) Field of Classification Search
None
See application file for complete search history.

(56) References Cited

U.S. PATENT DOCUMENTS

2016/0095124 A1    3/2016  Papasakellariou
2016/0135221 A1*   5/2016  Yang ............... H04L 5/0053
                                                   370/329
(Continued)

FOREIGN PATENT DOCUMENTS

CN    103944665    7/2014
CN    104285386    1/2015
(Continued)

OTHER PUBLICATIONS

EPO, Office Action for EP Application No. 16921126.5, dated Jul. 25, 2019.
(Continued)

*Primary Examiner* — Diane L Lo
(74) *Attorney, Agent, or Firm* — Hodgson Russ LLP

(57) ABSTRACT

Embodiments of the present invention provide a terminal device scheduling method, a network device, and a terminal device. The method includes: determining, by a network device, first configuration information, the first configuration information indicating a time domain resource and a frequency domain resource used by the terminal device to perform a pre-scheduled service; and sending, by the network device, the first configuration information to the terminal device.

25 Claims, 8 Drawing Sheets

---

Determine, by the network device, first configuration information, the first configuration information indicating a time domain resource and a frequency domain resource used by the terminal device to perform a pre-scheduled service — 210

Send, by the network device, the first configuration information to the terminal device — 220

(56) References Cited

U.S. PATENT DOCUMENTS

| | | | | |
|---|---|---|---|---|
| 2016/0165622 | A1* | 6/2016 | Luo | H04L 5/0048 |
| | | | | 370/329 |
| 2016/0227517 | A1* | 8/2016 | Han | H04W 72/04 |
| 2016/0353410 | A1* | 12/2016 | Wang | H04W 72/1289 |
| 2018/0027493 | A1* | 1/2018 | Li | H04W 52/0216 |
| | | | | 370/280 |
| 2018/0352564 | A1* | 12/2018 | Ye | H04W 72/0413 |

FOREIGN PATENT DOCUMENTS

| | | |
|---|---|---|
| CN | 105101431 | 11/2015 |
| CN | 105472712 | 4/2016 |
| CN | 105792363 | 7/2016 |
| CN | 105992373 | 10/2016 |
| EP | 3253158 | 12/2017 |
| JP | 2009260956 A | 11/2009 |
| JP | 2011509012 A | 3/2011 |
| JP | 2015509329 A | 3/2015 |
| RU | 2479137 | 4/2013 |
| RU | 2733220 | 9/2020 |
| WO | 2014110928 A1 | 7/2014 |
| WO | 2014119921 | 8/2014 |
| WO | 2016045442 A1 | 3/2016 |
| WO | 2016119530 | 8/2016 |

OTHER PUBLICATIONS

CIPO, Office Action for CA Application No. 3043517, dated Jun. 23, 2020.
INAPI, Office Action for CL Application No. 201901285, dated Jun. 24, 2020.
CNIPA, Second Office Action for CN Application No. 201680090681.2, dated Jun. 8, 2020.
CNIPA, First Office Action for CN Application No. 201680090681.2, dated Mar. 10, 2020.
FIIP, Office Action for RU Application No. 2019117880/08, dated Apr. 3, 2020.
WIPO, ISR for PCT/CN2016/105471, Aug. 14, 2017.
FIIP, Office Action for RU Application No. 2019117880/08, dated Apr. 6, 2020.
Intellectual Property of India, First Examination Report for IN201917018884, dated Oct. 30, 2020.
Interdigital Communications, "Scheduling and support for service multiplexing", 3GPP TSG-RAN WG1 meeting #87, R1-1612316, 5 pages, Nov. 14, 2016, USA.
Intel Corporation, "UL URLLC transmission schemes", 3GPP TSG RAN WG1 Meeting #87, R1-1612004, 7 pages, Nov. 14, 2016, USA.
Qualcomm Incorporated, "SPS enhancements for V2X", 3GPP TSG-RAN WG1 #86Bis, R1-1609956, 4 pages, Oct. 10, 2016, USA.
JPO, First Office Action for JP 2019524382, dated Nov. 13, 2020.
IPO, Office Action for IL Application No. 266544, dated Dec. 27, 2020.
DGIP, Office Action for ID Application No. P00201904030, dated Apr. 27, 2021.

* cited by examiner

TERMINAL DEVICE SCHEDULING METHOD, NETWORK DEVICE, AND TERMINAL DEVICE

CROSS-REFERENCE TO RELATED APPLICATION

This application is a U.S. national phase application of International Application No. PCT/CN2016/105471, filed Nov. 11, 2016, the entire disclosure of which is incorporated herein by reference.

TECHNICAL FIELD

Embodiments of the present disclosure relates to the technical field of communication, and in particular, to a method for scheduling a terminal device, a network device and a terminal device.

BACKGROUND

The existing scheduling method for a network device to schedule a terminal device to perform a pre-scheduled service is not flexible. For example, when there is a conflict between a pre-scheduled service and other services, the entire scheduling process has to be executed all over again, with a rather low flexibility. Therefore, there is a demand for a more flexible method for scheduling a terminal device.

SUMMARY

Embodiments of the present disclosure provide a method for scheduling a terminal device to improve scheduling flexibility.

In a first aspect, there is provided a method for scheduling a terminal device, including: determining, by a network device, first configuration information, the first configuration information indicating a time domain resource and a frequency domain resource used by the terminal device to perform a pre-scheduled service; and sending, by the network device, the first configuration information to the terminal device.

The first configuration information is provided for indicating the time domain resource and the frequency domain resource used by the terminal device to perform the pre-scheduled service. As compared with the method of indicating only the transmission period and the frequency domain for the pre-scheduled service to be performed by the terminal device in the related art, the scheduling method in the present can flexibly schedule the terminal device to perform pre-scheduled service.

According to the first aspect, in some implementations of the first aspect, the pre-scheduled service is a periodic service, and the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

According to the first aspect, in some implementations of the first aspect, the pre-scheduled service is a non-periodic service, and the first configuration information indicates each time moment for the terminal device to perform the pre-scheduled service and the frequency domain resource used by the terminal device to perform the pre-scheduled service at each time moment, and the terminal device uses the same frequency domain resource to perform the pre-scheduled service at each time moment.

According to the first aspect, in some implementations of the first aspect, the first configuration information indicates each time moment for the terminal device to perform the pre-scheduled service and a respective frequency domain resource used by the terminal device to perform the pre-scheduled service at each time moment.

According to the first aspect, in some implementations of the first aspect, after the network device sends the first configuration information to the terminal device, the method further includes: sending, by the network device, second configuration information to the terminal device, wherein the second configuration information is used for reconfiguring the terminal device to perform the pre-scheduling service using a second frequency domain resource at at least one second time moment instead of using a first frequency domain resource at at least one first time moment.

According to the first aspect, in some implementations of the first aspect, the first configuration information is sent by the network device through high layer signaling or physical layer signaling.

According to the first aspect, in some implementations of the first aspect, the first configuration information includes time domain resource indication information and frequency domain resource indication information, the time domain resource indication information is sent by the network device through the high layer signaling, and the frequency domain resource indication information is sent by the network device through the physical layer signaling.

According to the first aspect, in some implementations of the first aspect, the method further includes: receiving, by the network device, a service request message from the terminal device, the service request message indicating a time moment when the terminal device will perform the pre-scheduled service and a size of data to be transmitted for the pre-scheduled service; wherein determining, by the network device, the first configuration information, includes: determining, by the network device, the first configuration information according to the service request message.

According to the first aspect, in some implementations of the first aspect, the first configuration information includes multiple pieces of indication information, any two of the multiple pieces of indication information indicate the time domain resource and the frequency domain resource for the terminal device to perform the pre-scheduled service in different indication manners, and the method further includes: sending, by the network device, scheduling information to the terminal device, the scheduling information indicating that the terminal device determines the time domain resource and the frequency domain resource used to perform the pre-scheduled service according to one of the multiple pieces of indication information.

In a second aspect, there is provided a method for scheduling a terminal device, including: receiving, by the terminal device, first configuration information from a network device, the first configuration information indicating a time domain resource and a frequency domain resource used by the terminal device to perform a pre-scheduled service; and performing, by the terminal device, the pre-scheduled service on the time domain resource and the frequency domain resource indicated by the first configuration information.

The first configuration information is provided for indicating the time domain resource and the frequency domain resource used by the terminal device to perform the pre-scheduled service. As compared with the method of indicating only the transmission period and the frequency domain for the pre-scheduled service to be performed by the terminal device in the related art, the method in the present disclosure can flexibly schedule the terminal device to perform pre-scheduled service.

According to the second aspect, in some implementations of the second aspect, the pre-scheduled service is a periodic service, the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

According to the second aspect, in some implementations of the second aspect, the pre-scheduled service is a non-periodic service, the first configuration information indicates each time moment for the terminal device to perform the pre-scheduled service and the frequency domain resource used by the terminal device to perform the pre-scheduled service at each time moment, and the terminal device uses the same frequency domain resource to perform the pre-scheduled service at each time moment.

According to the second aspect, in some implementations of the second aspect, the first configuration information indicates each time moment for the terminal device to perform the pre-scheduled service and a respective frequency domain resource used by the terminal device to perform the pre-scheduled service at each time moment.

According to the second aspect, in some implementations of the second aspect, after the terminal device receives the first configuration information from the network device, the method further includes: receiving, by the terminal device, second configuration information from the network device, wherein the second configuration information is used for reconfiguring the terminal device to perform the pre-scheduling service using a second frequency domain resource at at least one second time moment instead of using a first frequency domain resource at at least one first time moment.

According to the second aspect, in some implementations of the second aspect, the first configuration information is received by the terminal device through high layer signaling or physical layer signaling.

According to the second aspect, in some implementations of the second aspect, the first configuration information includes time domain resource indication information and frequency domain resource indication information, the time domain resource indication information is received by the terminal device through the high layer signaling, and the frequency domain resource indication information is received by the terminal device through the physical layer signaling.

According to the second aspect, in some implementations of the second aspect, the method further includes: sending, by the terminal device, a service request message to the network device, the service request message indicating a time moment when the terminal device will perform the pre-scheduled service and a size of data to be transmitted for the pre-scheduled service.

According to the second aspect, in some implementations of the second aspect, the first configuration information is determined according to the service request message.

According to the second aspect, in some implementations of the second aspect, the first configuration information includes multiple pieces of indication information, any two of the multiple pieces of indication information indicate the time domain resource and the frequency domain resource for the terminal device to perform the pre-scheduled service in different indication manners, and the method further includes: receiving, by the terminal device, scheduling information from the network device, the scheduling information indicating that the terminal device determines the time domain resource and the frequency domain resource used to perform the pre-scheduled service according to first indication information of the multiple pieces of indication information; and determining, by the terminal device, the time domain resource and the frequency domain resource used to perform the pre-scheduled service according to the first indication information of the multiple pieces of indication information.

In a third aspect, there is provided a method for scheduling a terminal device, including: receiving, by a network device, a service request message from the terminal device, the service request message indicating a time moment when the terminal device will perform a pre-scheduled service and a size of data to be transmitted for the pre-scheduled service; determining, by the network device, first configuration information according to the service request message, the first configuration information indicating a time domain resource and a frequency domain resource used by the terminal device to perform the pre-scheduled service; and sending, by the network device, the first configuration information to the terminal device.

The network device can determine the time domain resource and the frequency domain resource used by the terminal device to perform the pre-scheduled service more reasonably according to the service request message sent by the terminal device, so that the terminal device can perform the pre-scheduled service in a more desirable way.

According to the third aspect, in some implementations of the third aspect, the pre-scheduled service is a periodic service, the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

According to the third aspect, in some implementations of the third aspect, the pre-scheduled service is a non-periodic service, the first configuration information indicates each time moment for the terminal device to perform the pre-scheduled service and the frequency domain resource used by the terminal device to perform the pre-scheduled service at each time moment, and the terminal device uses the same frequency domain resource to perform the pre-scheduled service at each time moment.

According to the third aspect, in some implementations of the third aspect, the first configuration information indicates each time moment for the terminal device to perform the pre-scheduled service and a respective frequency domain resource used by the terminal device to perform the pre-scheduled service at each time moment.

According to the third aspect, in some implementations of the third aspect, after the network device sends the first configuration information to the terminal device, and the method further includes: sending, by the network device, second configuration information to the terminal device, wherein the second configuration information is used for reconfiguring the terminal device to perform the pre-scheduling service using a second frequency domain resource at at least one second time moment instead of using a first frequency domain resource at at least one first time moment.

According to the third aspect, in some implementations of the third aspect, the first configuration information is sent by the network device through high layer signaling or physical layer signaling.

According to the third aspect, in some implementations of the third aspect, the first configuration information includes time domain resource indication information and frequency domain resource indication information, the time domain resource indication information is sent by the network device through the high layer signaling, and the frequency domain resource indication information is sent by the network device through the physical layer signaling.

According to the third aspect, in some implementations of the third aspect, the first configuration information includes multiple pieces of indication information, and any two of the multiple pieces of indication information indicate the time domain resource and the frequency domain resource for the terminal device to perform the pre-scheduled service in different indication manners, and the method further includes: sending, by the network device, scheduling information to the terminal device, the scheduling information indicating that the terminal device determines the time domain resource and the frequency domain resource used to perform the pre-scheduled service according to first indication information of the multiple pieces of indication information.

In a fourth aspect, there is provided a method for scheduling a terminal device, including: sending, by the terminal device, a service request message to a network device, the service request message indicating a time moment when the terminal device will perform a pre-scheduled service and a size of data to be transmitted for the pre-scheduled service; receiving, by the terminal device, first configuration information from the network device, the first configuration information indicating a time domain resource and a frequency domain resource used by the terminal device to perform the pre-scheduled service; and performing, by the terminal device, the pre-scheduled service on the time domain resource and the frequency domain resource indicated by the first configuration information.

The network device can determine the time domain resource and the frequency domain resource used by the terminal device to perform the pre-scheduled service more reasonably according to the service request message sent by the terminal device, so that the terminal device can perform the pre-scheduled service in a more desirable way.

According to the fourth aspect, in some implementations of the fourth aspect, the pre-scheduled service is a periodic service, the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

According to the fourth aspect, in some implementations of the fourth aspect, the pre-scheduled service is a non-periodic service, the first configuration information indicates each time moment for the terminal device to perform the pre-scheduled service and the frequency domain resource used by the terminal device to perform the pre-scheduled service at each time moment, and the terminal device uses the same frequency domain resource to perform the pre-scheduled service at each of the time moments.

According to the fourth aspect, in some implementations of the fourth aspect, the first configuration information indicates each time moment for the terminal device to perform the pre-scheduled service and a respective frequency domain resource used by the terminal device to perform the pre-scheduled service at each time moment.

According to the fourth aspect, in some implementations of the fourth aspect, after the terminal device receives the first configuration information from the network device, the method further includes: receiving, by the terminal device, second configuration information from the network device, wherein the second configuration information is used for reconfiguring the terminal device to perform the pre-scheduling service using a second frequency domain resource at at least one second time moment instead of using a first frequency domain resource at at least one first time moment.

According to the fourth aspect, in some implementations of the fourth aspect, the first configuration information is received by the terminal device through high layer signaling or physical layer signaling.

According to the fourth aspect, in some implementations of the fourth aspect, the first configuration information includes time domain resource indication information and frequency domain resource indication information, the time domain resource indication information is received by the terminal device through the high layer signaling, and the frequency domain resource indication information is received by the terminal device through the physical layer signaling.

According to the fourth aspect, in some implementations of the fourth aspect, the first configuration information includes multiple pieces of indication information, any two of the multiple pieces of indication information indicate the time domain resource and the frequency domain resource for the terminal device to perform the pre-scheduled service in different indication manners, and the method further includes: receiving, by the terminal device, scheduling information from the network device, the scheduling information indicating that the terminal device determines the time domain resource and the frequency domain resource used to perform the pre-scheduled service according to first indication information of the multiple pieces of indication information.

In a fifth aspect, there is provided a network device including modules for performing the methods in the first aspect.

In a sixth aspect, there is provided a terminal device including modules for performing the methods in the second aspect.

In a seventh aspect, there is provided a network device including modules for performing the methods in the third aspect.

In an eighth aspect, there is provided a terminal device including modules for performing the methods in the fourth aspect.

In a ninth aspect, there is provided a network device including a memory, a transceiver and a processor, wherein the memory is configured to store a program, the processor is configured to execute the program, and when the program is executed, the processor and the transceiver are caused to perform the methods in the first aspect.

In a tenth aspect, there is provided a terminal device including a memory, a transceiver and a processor, wherein the memory is configured to store a program, the processor is configured to execute the program, and when the program is executed, the processor and the transceiver are caused to perform the methods in the second aspect.

In an eleventh aspect, there is provided a network device including a memory, a transceiver and a processor, wherein the memory is configured to store a program, the processor is configured to execute the program, and when the program is executed, the processor and the transceiver are caused to perform the methods in the third aspect.

In a twelfth aspect, there is provided a terminal device including a memory, a transceiver and a processor, wherein the memory is configured to store a program, the processor is configured to execute the program, and when the program is executed, the processor and the transceiver are caused to perform the methods in the fourth aspect.

In a thirteenth aspect, there is provided a computer readable medium storing program codes to be executed by a device, and the program codes includes instructions for performing the methods in the first aspect.

In a fourteenth aspect, there is provided a computer readable medium storing program codes to be executed by a device, and the program codes includes instructions for performing the methods in the second aspect.

In a fifteenth aspect, there is provided a computer readable medium storing program codes to be executed by a device, and the program codes includes instructions for performing the methods in the third aspect.

In a sixteenth aspect, there is provided a computer readable medium storing program codes to be executed by a device, and the program codes includes instructions for performing the methods in the fourth aspect.

In a seventeenth aspect, there is provided a system chip including an input interface, an output interface, a processor, and a memory, the processor is configured to execute codes in the memory, and when the code is executed, the processor can implement the various processes performed by the network device in the first aspect.

In an eighteenth aspect, there is provided a system chip including an input interface, an output interface, a processor, and a memory, the processor is configured to execute codes in the memory, and when the code is executed, the processor can implement the various processes performed by the network device in the second aspect.

In a nineteenth aspect, there is provided a system chip including an input interface, an output interface, a processor, and a memory, the processor is configured to execute codes in the memory, and when the code is executed, the processor can implement the various processes performed by the network device in the third aspect.

In a twentieth aspect, there is provided a system chip including an input interface, an output interface, a processor, and a memory, the processor is configured to execute codes in the memory, and when the code is executed, the processor can implement the various processes performed by the network device in the fourth aspect.

DETAILED DESCRIPTION

Figure 1:
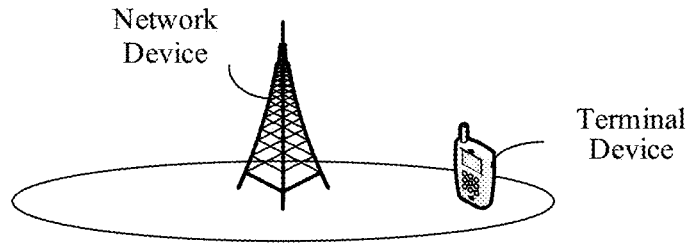
FIG. 1 is a schematic diagram of a possible application scenario of an embodiment of the present disclosure.

The technical solutions in the embodiments of the present disclosure will be clearly and completely described in the following with reference to the accompanying drawings.

It should be understood that the method for scheduling a terminal device in the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a Universal Mobile Telecommunication (UMTS) System and other existing communication systems, and in particular, may be applied to a future fifth generation mobile communication technology (5G) system.

In particular, the technical solution of the embodiments of the present disclosure may be applied to various communication systems based on non-orthogonal multiple access technology, such as a Sparse Code Multiple Access (SCMA) system, and a Low Density Signature (LDS) system, etc. However, the SCMA system and the LDS system may also be referred to otherwise in the field of communication. Further, the technical solution of the embodiments of the present disclosure may be applied to a multi-carrier transmission system utilizing non-orthogonal multiple access technology, such as Orthogonal Frequency Division Multiplexing (OFDM), Filter Bank Multi-Carrier (FBMC), Generalized Frequency Division Multiplexing (GFDM), and Filtered-OFDM (F-OFDM) systems that utilize non-orthogonal multiple access technology.

The network device in the embodiments of the present disclosure may be a device for communicating with a terminal device. The network device may be a Base Transceiver Station (BTS) in a GSM system or a CDMA system, or a base station (NodeB, NB) in a WCDMA system. The network device may also be an evolved base station (Evolutional NodeB, eNB or eNodeB) in a LTE system, or may be a wireless controller in a Cloud Radio Access Network (CRAN) scenario. Alternatively, the network-side device may be a relay station, an access point, an on-board vehicle device, a wearable device, and a network-side device in a future 5G network or a network-side device in a future evolved PLMN network, etc., which is not limited in the embodiments of the present disclosure.

The terminal device in the embodiment of the present disclosure may be a user equipment (User Equipment, UE), an access terminal, a subscriber unit, a subscriber station, a mobile station, a moving station, a remote station, a remote terminal, a mobile device, a user terminal, a terminal, and a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device with wireless communication capability, a computing device or other processing device connected to a wireless modem, an on-board vehicle device, a wearable device, a terminal device in a future 5G network, or a terminal device in a future evolved Public Land Mobile Networks (PLMN), which is not limited in the embodiments of the present disclosure.

For a better understanding of the method for scheduling a terminal device, the network device, and the terminal device according to the embodiments of the present disclosure, a scenario that may be applied to the embodiments of the present disclosure is briefly introduced in the following with reference to FIG. 1.

FIG. 1 is a schematic diagram of a possible application scenario of an embodiment of the present disclosure. The communication system shown in FIG. 1 includes a network device and a terminal device. The network device may schedule a terminal device to perform a pre-scheduled service with a scheduling command. Specifically, the network device may, with the scheduling command, schedule the terminal device to transmit uplink data to a base station through a corresponding frequency domain resource at a certain time moment or time point. Alternatively, the network device may, with the scheduling command, schedule the terminal device to receive downlink data from a base station through a corresponding frequency domain resource at a certain time moment or time point.

Figure 2:
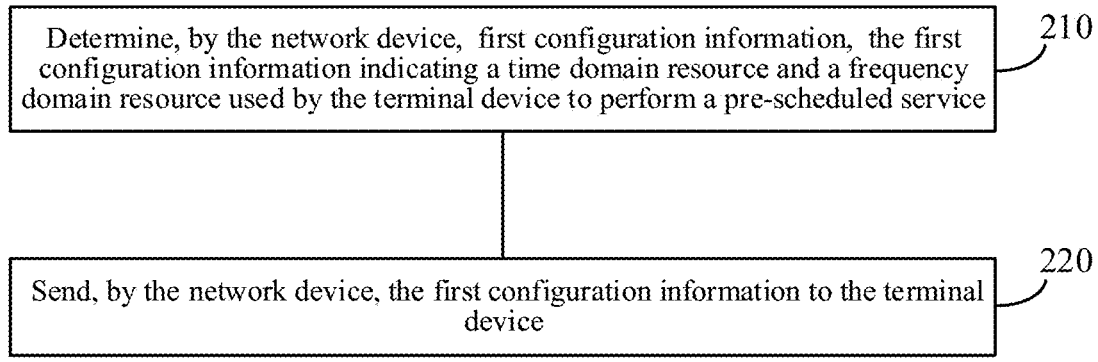
FIG. 2 is a schematic flowchart of a method for scheduling a terminal device according to an embodiment of the present disclosure.

FIG. 2 is a schematic flowchart of a method for scheduling a terminal device according to an embodiment of the present disclosure. The method of FIG. 2 includes the following steps.

In step 210, the network device determines first configuration information. The first configuration information indicates a time domain resource and a frequency domain resource used by the terminal device to perform a pre-scheduled service.

The first configuration information may indicate the time domain resource and the frequency domain resource used by the terminal device to perform the pre-scheduled service in various indication manners. Specifically, the first configuration information may indicate the time and frequency domain resources used by the terminal device to perform the pre-scheduled service in at least the following three situations.

In the first situation, the pre-scheduled service is a periodic service, and the first configuration information indicates a transmission period of the pre-scheduled service and a frequency domain resource used by the terminal device to perform the pre-scheduled service at each of the time moments. At at least two of the time moments, the terminal device uses different frequency domain resources to perform the pre-scheduled service.

The periodic service may be a service of periodically transmitting data between the terminal device and the network device. For example, a smart meter transmits user's power consumption data to the network device at a fixed time interval.

The first configuration information may indicate the transmission period of the pre-scheduled service and the frequency domain resource used by the terminal device to perform the pre-scheduled service at each of the time moments in various manners. For example, the first configuration information may be {T, F1, F2, F3, . . . }, where T represents the transmission period of the pre-scheduled service, and the terminal device performs the pre-scheduled service at every time T, and F1, F2, F3, . . . represent the frequency domain resources used by the terminal device to perform the pre-scheduled service for the first time, the second time, and the third time . . . , respectively.

However, the first configuration information is composed of information of a single period and information of a list. The period information indicates the transmission period of the pre-scheduled service is T, and the list information is as shown in Table 1, in which F1, F2, F3, . . . represent the frequency domain resources used by the terminal device to perform the pre-scheduled service at a first time moment, a second time moment, and a third time moment . . . , respectively. A time interval between the first time moment and the second time moment is T, and a time interval between the second time moment and the third time moment is also T. The first time moment may be a time moment when a preset time interval has elapsed since the terminal device receives the first configuration information, the size of the preset time interval may be determined according to a communication protocol, or the preset time interval may be negotiated between the terminal device and the network device. Alternatively, the terminal device does not perform the pre-scheduled service immediately upon receipt of the first configuration information, but performs the pre-scheduled service immediately upon receipt of trigger information from the network device.

TABLE 1

| F1 |
|----|
| F2 |
| F3 |
| F4 |
| ... |

The above list information may also be as shown in Table 2. As shown in Table 2, 1, 2 and 3 respectively indicate the first time moment, the second time moment, and the third time moment when the terminal device performs the pre-scheduled service. F 1, F2, F3, . . . represent the frequency domain resources used by the terminal device to perform the pre-scheduled service at the first time moment, the second time moment, and the third time moment, respectively.

TABLE 2

| 1 | F1 |
|---|----|
| 2 | F2 |
| 3 | F3 |
| ... | ... |

In addition, the frequency domain resources for the terminal device to perform the pre-scheduled service at different time moments may also be periodic. As shown in Table 3 and Table 4, the frequency domain resources corresponding to the first time moment to the third time moment are F 1, F2, and F3, respectively. The frequency domain resources corresponding to the fourth time moment to the sixth time moment are also F 1, F2, and F3, respectively. That is to say, there are three kinds of frequency domain resources, and the frequency domain resources used by the terminal device to perform the pre-scheduled service are cycled once for every three time moments. By configuring the frequency domain resources in cycles, the frequency domain resources may be utilized more effectively, and the utilization of the frequency domain resources can be improved.

TABLE 3

| F1 |
|---|
| F2 |
| F3 |
| F1 |
| F2 |
| F3 |
| ... |

TABLE 4

| 1 | F1 |
|---|---|
| 2 | F2 |
| 3 | F3 |
| 5 | F1 |
| 6 | F2 |
| 7 | F3 |
| ... | ... |

In the first situation, when the pre-scheduled service is a periodic service, the first configuration information only indicates the period in which the terminal device performs the pre-scheduled service, and does not have to indicate each time moment that the terminal device performs the pre-scheduled service. Therefore, it can save certain signaling overhead for scheduling the terminal device to perform the pre-scheduled service.

In the second situation, the pre-scheduled service is a non-periodic service, and the first configuration information indicates each time moment for the terminal device to perform the pre-scheduled service and the frequency domain resource used by the terminal device to perform the pre-scheduled service at each time moment. The terminal device uses the same frequency domain resource to perform the pre-scheduled service at each of the time moments.

The first configuration information may include two kinds of information, of which one kind of information indicates the frequency domain resource used by the terminal device to perform the pre-scheduled service, and another kind of information indicates each time moment for the terminal device to perform the pre-scheduled service. For example, the first configuration information includes first information and second information, of which the first information indicates the terminal device to perform the pre-scheduled service using the frequency domain resource F1, and the second information is the list information as shown in Table 5, and indicates the terminal device to perform the pre-scheduled service at time moments T1, T2 and T3, respectively, and the frequency domain resource used by the terminal device to perform the pre-scheduled service at each of the time moments T1, T2, and T3 is F1.

TABLE 5

| T1 |
|---|
| T2 |
| T3 |
| T4 |
| ... |

In the third situation, the first configuration information indicates each time moment for the terminal device to perform the pre-scheduled service, and a respective frequency domain resource used by the terminal device to perform the pre-scheduled service at each time moment.

In the third situation, the pre-scheduled service may be a periodic service or a non-periodic service. That is, the first configuration information indicates each time moment for the terminal device to perform the pre-scheduled service and a respective frequency domain resource used by the terminal device to perform the pre-scheduled service at each time moment, regardless of whether the pre-scheduled service is a periodic service or not. In this case, the first configuration information may have a specific form as shown in Table 6, which indicates that the frequency domain resources used by the terminal device to perform the pre-scheduled service at time moments T1, T2, T3 . . . are F1, F2, and F3 . . . , respectively.

TABLE 6

| T1 | F1 |
|---|---|
| T2 | F2 |
| T3 | F3 |
| ... | ... |

The first configuration information may also be in a specific form as shown in Table 7. In Table 7, the frequency domain resources used by the terminal device to perform the pre-scheduled service at time moments T1-T3 are F1, F2, and F3, respectively, and the frequency domain resources used by the terminal device to perform the pre-scheduled service at time moments T4-T6 are also F1, F2, and F3 respectively. That is to say, the frequency domain resources used by the terminal device to perform the pre-scheduled service are cycled, and the frequency domain resources used by the terminal device to perform the pre-scheduled service are cycled once for every three time moments.

TABLE 7

| T1 | F1 |
|---|---|
| T2 | F2 |
| T3 | F3 |
| T4 | F1 |
| T5 | F2 |
| T6 | F3 |
| ... | ... |

It should be understood that, in Tables 1 to 7 as shown above, F1, F2, and F3 may be three different frequency domain resources. Alternatively, two of F1, F2, and F3 may also be the frequency domain resource, for example, F1 and F2 are the same frequency domain resource, or F2 and F3 are the same frequency domain resource, or F1 and F3 are the same frequency domain resource.

It should also be understood that the multiple time moments mentioned above are multiple time domain resources used by the terminal device to perform the pre-scheduled service. That is, the time moment means the time domain resource, and the terminal device performing the pre-scheduled service at the multiple time moments on the corresponding frequency domain resources means the terminal device performing the pre-scheduled service at the multiple time domain resources and on the corresponding frequency domain resources.

In step 220, the network device sends the first configuration information to the terminal device.

The pre-scheduled service may be an uplink service in which the terminal device sends data to the network device, or may be a downlink service in which the terminal device receives data from the network device. When the pre-scheduled service is an uplink service, the terminal device sends service data to the network device on the time domain resource and the frequency domain resource indicated by the first configuration information after receiving scheduling information from the network device. When the pre-scheduled service is a downlink service, after receiving scheduling information from the network device, the terminal device receives service data from the network device on the time domain resource and the frequency domain resource indicated by the first configuration information.

In the embodiments of the present disclosure, first configuration information is provided for indicating the time domain resource and the frequency domain resource used by the terminal device to perform the pre-scheduled service. As compared with the method of indicating only the transmission period and the frequency domain for the pre-scheduled service to be performed by the terminal device in the related art, the present disclosure can flexibly schedule the terminal device to perform pre-scheduled service.

In some embodiments, after the network device sends the first configuration information to the terminal device, the network device may further send, to the terminal device, second configuration information, and the second configuration information is used for reconfiguring the terminal device to perform the pre-scheduling service using a second frequency domain resource at at least one second time moment instead of using a first frequency domain resource at at least one first time moment.

By the second configuration information, it is possible to change the one or more time moments and the corresponding frequency resource for the terminal device to perform the pre-scheduled service. By enabling flexible configuration, the flexibility in scheduling is improved and conflicts with other services can be avoided.

For example, the first configuration information indicates that the terminal device to perform the pre-scheduled service using a frequency domain resource F1 at a time moment T1, and the second configuration information reconfigures the terminal device, to indicate the terminal device to perform the pre-scheduled service using a frequency domain resource F1' at a time moment T1', instead of using a frequency domain resource F1 at a time moment T1. Here, T1 is different from T1', and F1 is the same as F1'; or T1 is the same as T1', and F1 is different from F1'; or T1 is different from T1', and F1 is different from F1'. That is, the second configuration information may only change the time moment when the terminal device performs the pre-scheduled service, or may only change the frequency domain resource used by the terminal device to perform the pre-scheduled service, or change both of the time moment when the terminal device performs the pre-scheduled service and the frequency domain resource used by the terminal device to perform the pre-scheduled service.

The above example shows a case where the at least one first time moment and the at least one second time moment each indicates one time moment, when the at least one first time moment and the at least one second time moment each include a plurality of time moments, for example, the at least one first time moment includes time moments {T1, T2, T3}, and the frequency domain resources corresponding to the time moments {T1, T2, T3} are {F1, F2, F3}, respectively, and the at least one second time moments include time moments {T1', T2', T3'}, and the frequency domain resources corresponding to the time moments {T1', T2', T3'} are {F1', F2', F3'}, respectively, then in this case, one or more of the time moments {T1, T2, T3} may be the same as one or more of the time moments {T1', T2', T3'}, or the time moments {T1, T2, T3} are totally different from the time moments {T1', T2', T3'}. Similarly, one or more of {F1, F2, F3} may be the same as one or more of {F1', F2', F3'}, or {F1, F2, F3} is totally different from {F1', F2', F3'}.

When the network device in the related art uses a semi-static scheduling mode to schedule the terminal device to perform the pre-scheduled service, the configuration information sent to the terminal device indicates the period in which the terminal device performs the pre-scheduled service and the frequency domain resource used to perform the pre-scheduled service. For example, the network device sends first scheduling information to the terminal device, where the first scheduling information indicates that the terminal device transmits the uplink data for a period of 100 ms, and the frequency domain resource used for transmitting the uplink data is the first frequency domain resource. Then, the terminal device transmits uplink data to the network device at a transmission period of 100 ms starting from a certain time moment after the terminal device receives the first scheduling information, and the certain time moment may be the time moment upon receipt of the first scheduling information, or may be a time moment after a time interval has elapsed since the terminal device receives the first scheduling information.

When it is needed to change the time moment and the frequency domain resource for the terminal device to perform the pre-scheduled service, the network device may send new configuration information to the terminal device. However, after receiving the new configuration information, starting from the time point when the configuration changes, all the configuration has been changed; however, in fact, it may not be necessary to change all the time moments, but only need to change some of the specified time moments. Therefore, the semi-static scheduling mode in the related art is rather inflexible.

Such indication manner does not directly indicate which frequency domain resource is used by the terminal device to transmit the uplink data to the network device at each of the time moments. The first configuration information in the embodiments of the present disclosure may directly indicate which frequency domain resource is used by the terminal device to transmit the uplink data to the network device at each of the time moments. Therefore, the indication manner of the embodiment of the present disclosure is more flexible.

In the embodiments of the present disclosure, with the second configuration information, it is possible to change the frequency domain resource and the time domain resource used by the terminal device to perform the pre-scheduled service at a specified time moment, while keeping other frequency domain resources for transmitting the uplink data at other time moments unchanged. Therefore, as compared with the related art, the changes are small and the method is flexible.

In some embodiments, when the frequency domain resources used by the terminal device to perform the pre-scheduled service also have periodicity, the first configuration information may specifically be {P1, F1, OF1; P2, F2, OF2; P3, F3, OF3 . . . }, in which a period of the frequency domain resource F1 is P1, and a time domain offset from the starting time moment is OF1. That is to say, the terminal device performs the pre-scheduled service using the frequency domain resource F1 when the time interval OF1 has elapsed since the starting time moment. Then, the pre-scheduled service is performed using the frequency domain resource P1 once every time when the time period P1 has elapsed. Other frequency domain resources are similar to the case of the frequency domain resource F1. In addition, if OF1 is equal to zero, the terminal device performs the pre-scheduled service using the frequency domain resource F1 from the starting time moment.

Optionally, the first configuration information and the second configuration information may be sent by the network device through high layer signaling or physical layer signaling.

The high layer signaling here may be Radio Resource Control (RRC) signaling, and the physical layer signaling may be signaling that is sent on a Physical Downlink Control Channel (PDCCH).

In some embodiments, the first configuration information includes time domain resource indication information and frequency domain resource indication information. The time domain resource indication information is sent by the network device through high layer signaling, and the frequency domain resource indication information is sent by the network device through physical layer signaling.

Similarly, the second configuration information may also include time domain resource indication information and frequency domain resource indication information. The time domain resource indication information is sent by the network device through high layer signaling, and the frequency domain resource indication information is sent by the network device through physical layer signaling.

The base station may configure a time moment list including T1, T2, T3, . . . through RRC signaling, the time moment list indicates that the terminal will have scheduled service at the time moments indicated in the list. The base station may indicate, at a scheduling time moment or in a previously negotiated time moment before the scheduling time moment, a frequency domain resource for performing the pre-scheduled service at the scheduled time moment through physical signaling. In addition, the base station may also indicate, at a time the frequency domain resource used by the terminal device to perform the pre-scheduled service at multiple time moments.

Specifically, the base station may indicate to the terminal, at a time moment T1 and through PDCCH, the frequency domain resource used to perform the pre-scheduled service at the time moment T1. The base station may also indicate to the terminal, at a predetermined time moment T1' before the time T1 and through PDCCH, the frequency domain resource used to perform the pre-scheduled service at the time moment T1. In addition, the base station may indicate to the terminal at a time moment T1 and through PDCCH, the frequency domain resources used to perform the pre-scheduled service respectively at the time moments T1, T2 and T3. Alternatively, the base station may indicate to the terminal, at a predetermined time moment T1' before the time T1 and through PDCCH, the frequency domain resources used to perform the pre-scheduled service respectively at the time moments T1, T2 and T3.

In some embodiments, the method for scheduling a terminal device further includes: the network device receiving a service request message from the terminal device, and the service request message indicates a time moment when the terminal device will perform the pre-scheduled service and a size of data to be transmitted for the pre-scheduled service. The network device determining the first configuration information includes: the network device determining the first configuration information according to the service request message.

Specifically, the service request information may be specifically in the form shown in Table 8. As shown in Table 8, the terminal device needs to transmit a service with a data size of S1 at a time moment T1, and needs to transmit a service with a data size of S2 at a time moment T2. After receiving the service request message, the terminal device may determine the first configuration information according to the service request message. For example, the first configuration information may indicate that the terminal device transmits the service with the data size of S1 at the time moment T1 using a frequency domain resource F1, and transmits the service with the data size of S2 at the time moment T2 using a frequency domain resource F2.

In the embodiment of the present disclosure, the network device can determine the time domain resource and the frequency domain resource used by the terminal device to perform the pre-scheduled service more reasonably according to the service request message sent by the terminal device, so that the terminal device can perform the pre-scheduled service in a more desirable way.

For a terminal device or an Internet of Things terminal device that performs machine-based communication with a relatively fixed service demand, the terminal device may report in advance to the network device through the service request message, the time moment for transmitting the data and the size of data to be transmitted. In this way, the network device may allocate resources to the terminal at one time in a pre-scheduled manner to save signaling overhead.

In some embodiments, the first configuration information may include multiple pieces of indication information, and each of the multiple pieces of indication information indicates a time domain resource and a frequency domain resource used by the terminal device to perform the pre-scheduled service. However, any two of the multiple pieces of indication information indicate the time domain resource and the frequency domain resource in different indication manners. The method for scheduling a resource also includes: the network device sending scheduling information to the terminal device, where the scheduling information indicates that the terminal device determines the time domain resource and the frequency domain resource used to perform the pre-scheduled service according to one of the multiple pieces of indication information. That is, the first configuration information may carry indication information with different indication manners, and scheduling information sent by the network device to the terminal device specifies which indication manner is selected to determine the time domain resource and the frequency domain resource used for performing the pre-scheduled service.

The method for scheduling a terminal device according to the embodiments of the present disclosure has been described in detail above with reference to FIG. 2 from the perspective of the network device. The method for scheduling a terminal device according to the embodiments of the present disclosure will be described in detail below with reference to FIG. 3 from the perspective of the terminal device.

It should be understood that the method for scheduling a terminal according to the embodiments of the present disclosure described from the perspective of the terminal device is corresponding to the method for scheduling the terminal according to the embodiments of the present disclosure from the perspective of the network device, and the repeated description will be omitted as appropriate for the sake of brevity.

Figure 3:
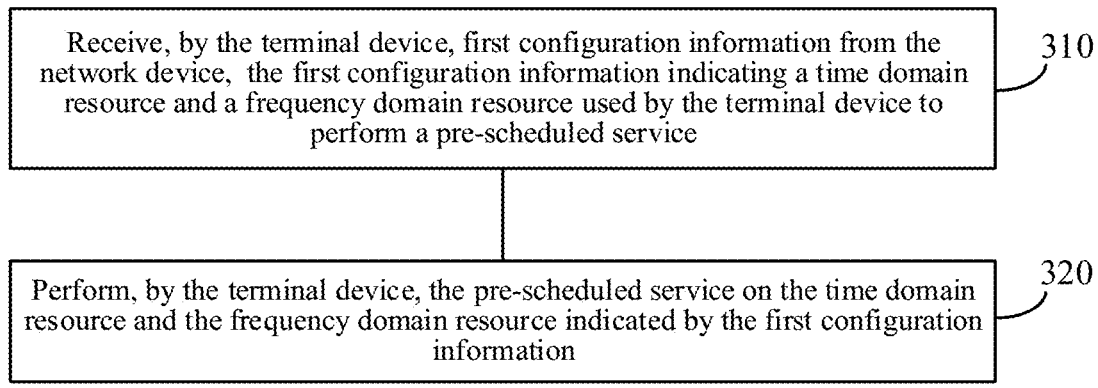
FIG. 3 is a schematic flowchart of a method for scheduling a terminal device according to an embodiment of the present disclosure.

FIG. 3 is a schematic flowchart of a method for scheduling a terminal device according to an embodiment of the present disclosure. The method of FIG. 3 includes the following steps.

In step 310, the terminal device receives first configuration information from the network device. The first configuration information indicates a time domain resource and a frequency domain resource used by the terminal device to perform a pre-scheduled service.

In step 320, the terminal device performs the pre-scheduled service on the time domain resource and the frequency domain resource indicated by the first configuration information.

In the embodiment of the present disclosure, the first configuration information indicates the time domain resource and the frequency domain resource used by the terminal device to perform the pre-scheduled service. As compared with the method of indicating only the transmission period and the frequency domain for the pre-scheduled service to be performed by the terminal device in the related art, the present disclosure can flexibly schedule the terminal device to perform pre-scheduled service.

Optionally, the first configuration information may indicate the time domain resource and the frequency domain resource used by the terminal device to perform the pre-scheduled service in various indication manners, specifically, in at least the following three situations.

(1) The pre-scheduled service is a periodic service, and the first configuration information indicates a transmission period of the pre-scheduled service and a frequency domain resource used by the terminal device to perform the pre-scheduled service at each of the time moments. At at least two of the time moments, the terminal device uses different frequency domain resources to perform the pre-scheduled service.

(2) The pre-scheduled service is a non-periodic service, and the first configuration information indicates each time moment for the terminal device to perform the pre-scheduled service and the frequency domain resource used by the terminal device to perform the pre-scheduled service at each of the time moments. The terminal device uses the same frequency domain resource to perform the pre-scheduled service at each of the time moments.

(3) The first configuration information indicates each time moment for the terminal device to perform the pre-scheduled service and a respective frequency domain resource used by the terminal device to perform the pre-scheduled service at each time moment.

Optionally, as an embodiment, after the terminal device receives the first configuration information from the network device, the method further includes: the terminal device receiving second configuration information from the network device, and the second configuration information is for reconfiguring the terminal device to perform the pre-scheduling service using a second frequency domain resource at at least one second time moment instead of using a first frequency domain resource at at least one first time moment.

Optionally, as an embodiment, the first configuration information is received by the terminal device through high layer signaling or physical layer signaling.

Optionally, as an embodiment, the first configuration information includes time domain resource indication information and frequency domain resource indication information. The time domain resource indication information is received by the terminal device through high layer signaling. The frequency domain resource indication information is received by the terminal device through physical layer signaling.

Optionally, as an embodiment, the method further includes: the terminal device sending a service request message to the network device, and the service request message indicates a time moment when the terminal device will perform the pre-scheduled service and a size of data to be transmitted for the pre-scheduled service.

Optionally, as an embodiment, the first configuration information is determined according to the service request message.

Optionally, as an embodiment, the first configuration information includes multiple pieces of indication information. Any two of the multiple pieces of indication information indicate the time domain resource and the frequency domain resource for the terminal device to perform the pre-scheduled service in different indication manners. The method includes: the terminal device receiving scheduling information from the network device, and the scheduling information indicates that the terminal device determines the time domain resource and the frequency domain resource used to perform the pre-scheduled service according to first indication information of the multiple pieces of indication information; and the terminal device determining the time domain resource and the frequency domain resource used to perform the pre-scheduled service according to the first indication information of the multiple pieces of indication information.

Figure 4:
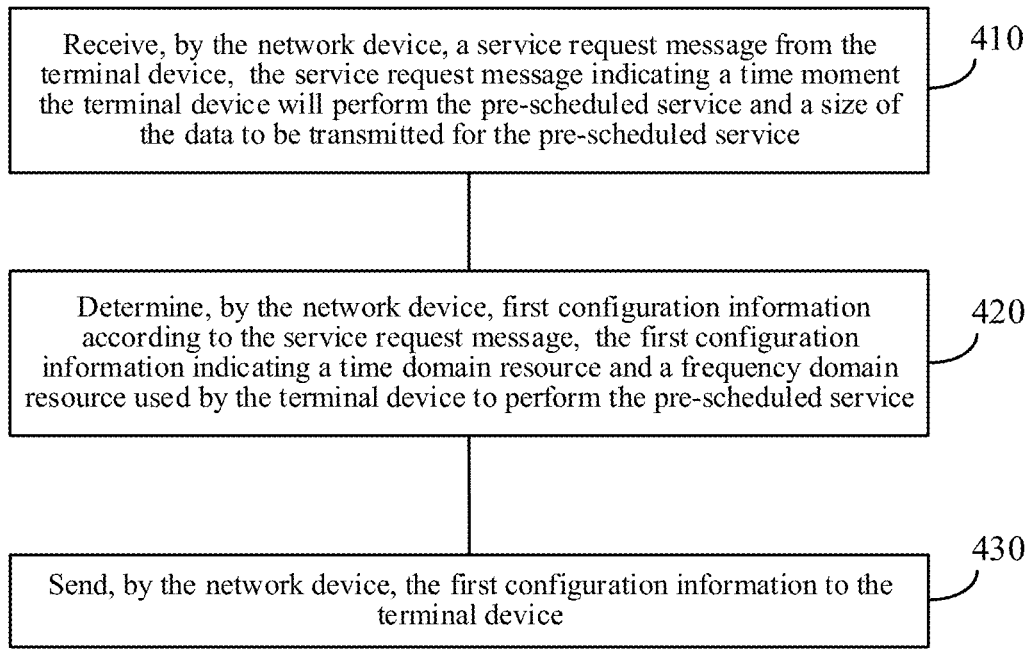
FIG. 4 is a schematic flowchart of a method for scheduling a terminal device according to an embodiment of the present disclosure.

FIG. 4 is a schematic flowchart of a method for scheduling a terminal device according to an embodiment of the present disclosure. The method of FIG. 4 includes the following steps.

In step 410, the network device receives a service request message from the terminal device. The service request message indicates a time moment for the terminal device to perform the pre-scheduled service and a size of data to be transmitted for the pre-scheduled service.

In step 420, the network device determines first configuration information according to the service request message. The first configuration information indicates a time domain resource and a frequency domain resource used by the terminal device to perform the pre-scheduled service.

In step 430, the network device sends the first configuration information to the terminal device.

In the embodiment of the present disclosure, the network device can determine the time domain resource and the frequency domain resource used by the terminal device to perform the pre-scheduled service more reasonably according to the service request message sent by the terminal device, so that the terminal device can perform the pre-scheduled service in a more desirable way.

Specifically, when scheduling, the network device allocates resources to the terminal at one time according to the requirements of the terminal device, thereby reducing the signaling overhead caused by scheduling the terminal device for multiple times.

It should be understood that the form of the first configuration information determined by the network device and the subsequent second configuration information are the same as those described in the scheduling method shown in FIG. 2 as described above, and the duplicated description will be omitted herein for the sake of brevity.

In some embodiments, the first configuration information may indicate the time domain resource and the frequency domain resource used by the terminal device to perform the pre-scheduled service in various indication manners, specifically, in at least the following three situations.

(4) The pre-scheduled service is a periodic service, and the first configuration information indicates a transmission period of the pre-scheduled service and a frequency domain resource used by the terminal device to perform the pre-scheduled service at each of the time moments. At at least two of the time moments, the terminal device uses different frequency domain resources to perform the pre-scheduled service.

(5) The pre-scheduled service is a non-periodic service, and the first configuration information indicates each time moment for the terminal device to perform the pre-scheduled service and the frequency domain resource used by the terminal device to perform the pre-scheduled service at each of the time moments. The terminal device uses the same frequency domain resource to perform the pre-scheduled service at each of the time moments.

(6) The first configuration information indicates each time moment for the terminal device to perform the pre-scheduled service and a respective frequency domain resource used by the terminal device to perform the pre-scheduled service at each time moment.

In some embodiments, after the terminal device receives the first configuration information from the network device, the method further includes: the terminal device receiving second configuration information from the network device, and the second configuration information is for reconfiguring the terminal device to perform the pre-scheduling service using a second frequency domain resource at at least one second time moment instead of using a first frequency domain resource at at least one first time moment.

In some embodiments, the first configuration information is received by the terminal device through high layer signaling or physical layer signaling.

In some embodiments, the first configuration information includes time domain resource indication information and frequency domain resource indication information. The time domain resource indication information is received by the terminal device through high layer signaling. The frequency domain resource indication information is received by the terminal device through physical layer signaling.

In some embodiments, the method further includes: the terminal device sending a service request message to the network device, and the service request message indicates a time moment when the terminal device will perform the pre-scheduled service and a size of data to be transmitted for the pre-scheduled service.

In some embodiments, the first configuration information is determined according to the service request message.

In some embodiments, the first configuration information includes multiple pieces of indication information. Any two of the multiple pieces of indication information indicate the time domain resource and the frequency domain resource for the terminal device to perform the pre-scheduled service in different indication manners. The method includes: the terminal device receiving scheduling information from the network device, where the scheduling information indicates that the terminal device determines the time domain resource and the frequency domain resource used to perform the pre-scheduled service according to first indication information of the multiple pieces of indication information; and the terminal device determining the time domain resource and the frequency domain resource used to perform the pre-scheduled service according to the first indication information of the multiple pieces of indication information.

The method for scheduling a terminal device according to the embodiments of the present disclosure has been described in detail above with reference to FIG. 4 from the perspective of the network device. The method for scheduling a terminal device according to the embodiments of the present disclosure will be described in detail below with reference to FIG. 3 from the perspective of the terminal device.

It should be understood that the method for scheduling a terminal according to the embodiments of the present disclosure described from the perspective of the terminal device is corresponding to the method for scheduling the terminal according to the embodiments of the present disclosure from the perspective of the network device, and the repeated description will be omitted as appropriate for the sake of brevity.

Figure 5:
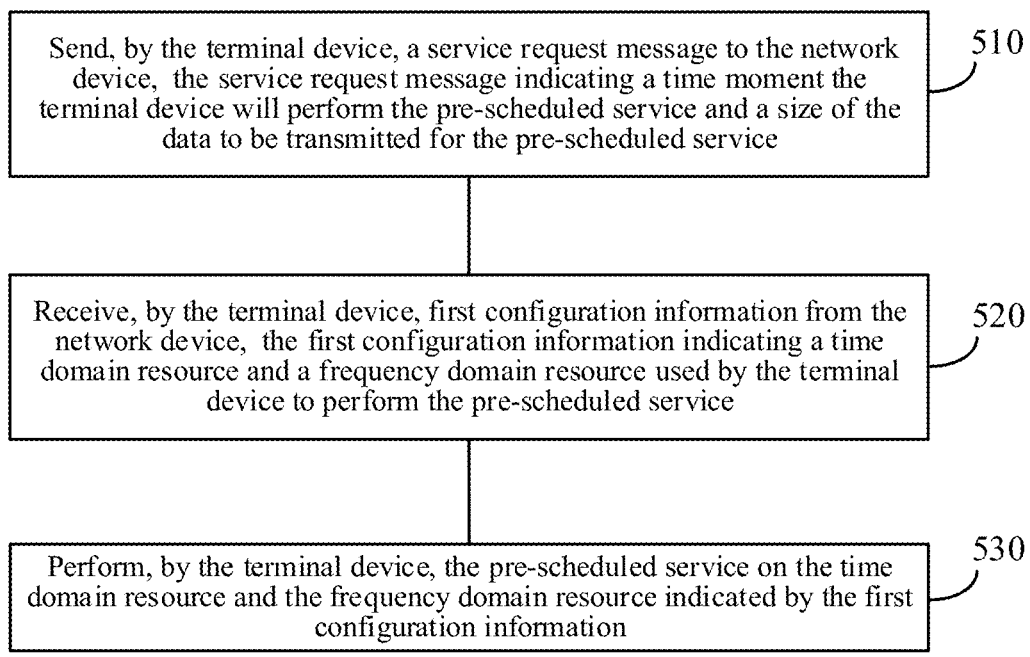
FIG. 5 is a schematic flowchart of a method for scheduling a terminal device according to an embodiment of the present disclosure.

FIG. 5 is a schematic flowchart of a method for scheduling a terminal device according to an embodiment of the present disclosure. The method of FIG. 5 includes the following steps.

In step 510, the terminal device sends a service request message to the network device. The service request message indicates a time moment when the terminal device will perform the pre-scheduled service and a size of data to be transmitted for the pre-scheduled service.

In step 520, the terminal device receives first configuration information from the network device, and the first configuration information indicates a time domain resource and a frequency domain resource used by the terminal device to perform the pre-scheduled service.

In step 530, the terminal device performs the pre-scheduled service on the time domain resource and the frequency domain resource indicated by the first configuration information.

In the embodiment of the present disclosure, the network device can determine the time domain resource and the frequency domain resource used by the terminal device to perform the pre-scheduled service more reasonably according to the service request message sent by the terminal device, so that the terminal device can perform the pre-scheduled service in a more desirable way.

Specifically, when scheduling, the network device allocates resources to the terminal at one time according to the requirements of the terminal device, thereby it can reduce the signaling overhead caused by scheduling the terminal device for multiple times.

In some embodiments, the first configuration information may indicate the time domain resource and the frequency domain resource used by the terminal device to perform the pre-scheduled service in various indication manners, specifically, in at least the following three situations.

(7) The pre-scheduled service is a periodic service, and the first configuration information indicates a transmission period of the pre-scheduled service and a frequency domain resource used by the terminal device to perform the pre-scheduled service at each of the time moments. At at least two of the time moments, the terminal device uses different frequency domain resources to perform the pre-scheduled service.

(8) The pre-scheduled service is a non-periodic service, and the first configuration information indicates each time moment for the terminal device to perform the pre-scheduled service and the frequency domain resource used by the terminal device to perform the pre-scheduled service at each of the time moments. The terminal device uses the same frequency domain resource to perform the pre-scheduled service at each of the time moments.

(9) The first configuration information indicates each time moment for the terminal device to perform the pre-scheduled service and a respective frequency domain resource used by the terminal device to perform the pre-scheduled service at each time moment.

Optionally, as an embodiment, after the terminal device receives the first configuration information from the network device, the method further includes: the terminal device receiving second configuration information from the network device, and the second configuration information is for reconfiguring the terminal device to perform the pre-scheduling service using a second frequency domain resource at at least one second time moment instead of using a first frequency domain resource at at least one first time moment.

Optionally, as an embodiment, the first configuration information is received by the terminal device through high layer signaling or physical layer signaling.

Optionally, as an embodiment, the first configuration information includes time domain resource indication information and frequency domain resource indication information. The time domain resource indication information is received by the terminal device through high layer signaling. The frequency domain resource indication information is received by the terminal device through physical layer signaling.

Optionally, as an embodiment, the first configuration information includes multiple pieces of indication information. Any two of the multiple pieces of indication information indicate the time domain resource and the frequency domain resource for the terminal device to perform the pre-scheduled service in different indication manners. The method includes: the terminal device receiving scheduling information from the network device, where the scheduling information indicates that the terminal device determines the time domain resource and the frequency domain resource used to perform the pre-scheduled service according to first indication information of the multiple pieces of indication information.

The method for scheduling a terminal device according to the embodiments of the present disclosure has been described in detail above with reference to FIGS. 2-5. A network device and a terminal device according to the embodiments of the present disclosure will be described in detail below with reference to FIGS. 6-13.

It should be understood that the network device and the terminal device described in FIGS. 6 to 13 can implement the steps of the method for scheduling a terminal device described in FIGS. 2 to 5, and the repeated description will be omitted as appropriate for the sake of brevity.

Figure 6:
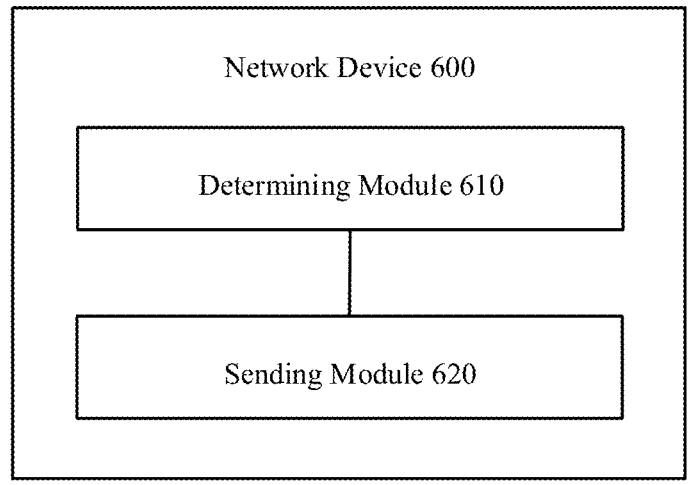
FIG. 6 is a schematic block diagram of a network device according to an embodiment of the present disclosure.

FIG. 6 is a schematic block diagram of a network device according to an embodiment of the present disclosure. The network device 600 as shown in FIG. 6 includes:

a determining module 610 configured to determine first configuration information, the first configuration information indicating a time domain resource and a frequency domain resource used by a terminal device to perform a pre-scheduled service; and a sending module 620 configured to send the first configuration information to the terminal device.

In the embodiment of the present disclosure, first configuration information is provided for indicating the time domain resource and the frequency domain resource used by the terminal device to perform the pre-scheduled service. As compared with the method of indicating only the transmission period and the frequency domain for the pre-scheduled service to be performed by the terminal device in the related art, it can flexibly schedule the terminal device to perform pre-scheduled service.

Optionally, as an embodiment, the pre-scheduled service is a periodic service, and the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

Optionally, as an embodiment, the pre-scheduled service is a non-periodic service, and the first configuration information indicates each time moment for the terminal device to perform the pre-scheduled service and the frequency domain resource used by the terminal device to perform the pre-scheduled service at each time moment, and the terminal device uses the same frequency domain resource to perform the pre-scheduled service at each of the time moments.

Optionally, as an embodiment, the first configuration information indicates each time moment for the terminal device to perform the pre-scheduled service and a respective frequency domain resource used by the terminal device to perform the pre-scheduled service at each time moment.

Optionally, as an embodiment, the sending module 620 is further configured to: after sending the first configuration information, send to the terminal device second configuration information, wherein the second configuration information is used for reconfiguring the terminal device to perform the pre-scheduling service using a second frequency domain resource at at least one second time moment instead of using a first frequency domain resource at at least one first time moment.

Optionally, as an embodiment, the first configuration information is sent by the sending module 620 through high layer signaling or physical layer signaling.

Optionally, as an embodiment, the first configuration information includes time domain resource indication information and frequency domain resource indication information, the time domain resource indication information is sent by the sending module 620 through the high layer signaling, and the frequency domain resource indication information is sent by the sending module 620 through the physical layer signaling.

Optionally, as an embodiment, the network device further includes:

a receiving module 630 configured to receive a service request message from the terminal device, the service request message indicating a time moment when the terminal device will perform the pre-scheduled service and a size of data to be transmitted for the pre-scheduled service;

wherein the determining module 610 is configured to:

determine the first configuration information according to the service request message.

Optionally, as an embodiment, the first configuration information includes multiple pieces of indication information, any two of the multiple pieces of indication information indicate the time domain resource and the frequency domain resource for the terminal device to perform the pre-scheduled service in different indication manners, and the sending module 620 is further configured to: send scheduling information to the terminal device, the scheduling information indicating that the terminal device determines the time domain resource and the frequency domain resource used to perform the pre-scheduled service according to one of the multiple pieces of indication information.

Figure 7:
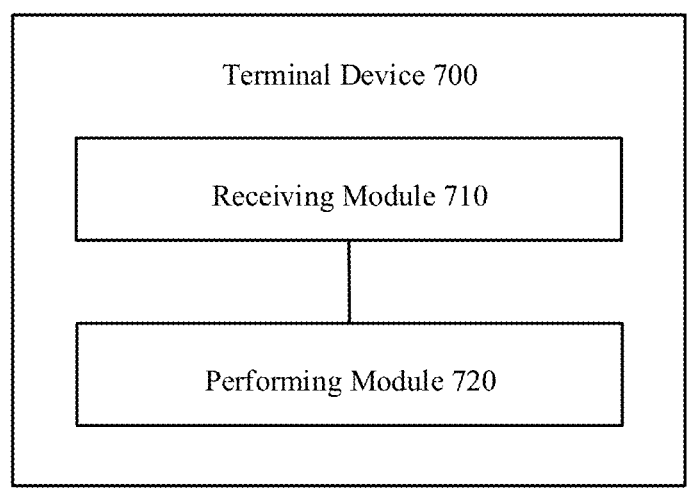
FIG. 7 is a schematic block diagram of a terminal device according to an embodiment of the present disclosure.

FIG. 7 is a schematic block diagram of a terminal device according to an embodiment of the present disclosure. The terminal device 700 as shown in FIG. 7 includes:

a receiving module 710 configured to receive first configuration information from a network device, the first configuration information indicating a time domain resource and a frequency domain resource used by the terminal device to perform a pre-scheduled service; and a performing module 720 configured to perform the pre-scheduled service on the time domain resource and the frequency domain resource indicated by the first configuration information.

In the embodiment of the present disclosure, first configuration information is provided for indicating the time domain resource and the frequency domain resource used by the terminal device to perform the pre-scheduled service. As compared with the method of indicating only the transmission period and the frequency domain for the pre-scheduled service to be performed by the terminal device in the related art, the present disclosure can flexibly schedule the terminal device to perform pre-scheduled service.

Optionally, as an embodiment, the pre-scheduled service is a periodic service, the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

Optionally, as an embodiment, the pre-scheduled service is a non-periodic service, and the first configuration information indicates each time moment for the terminal device to perform the pre-scheduled service and the frequency domain resource used by the terminal device to perform the pre-scheduled service at each time moment, and the terminal device uses the same frequency domain resource to perform the pre-scheduled service at each time moment.

Optionally, as an embodiment, the first configuration information indicates each time moment for the terminal device to perform the pre-scheduled service and a respective frequency domain resource used by the terminal device to perform the pre-scheduled service at each time moment.

Optionally, as an embodiment, the receiving module 710 is further configured to: after receiving the first configuration information from the network device, receive second configuration information from the network device, wherein the second configuration information is used for reconfiguring the terminal device to perform the pre-scheduling service using a second frequency domain resource at at least one second time moment instead of using a first frequency domain resource at at least one first time moment.

Optionally, as an embodiment, the first configuration information is received by the receiving module 710 through high layer signaling or physical layer signaling.

Optionally, as an embodiment, the first configuration information includes time domain resource indication information and frequency domain resource indication information, the time domain resource indication information is received by the receiving module 710 through the high layer signaling, and the frequency domain resource indication information is received by the receiving module 710 through the physical layer signaling.

Optionally, as an embodiment, the terminal device further includes:

a sending module 730 configured to send a service request message to the network device, the service request message indicating a time moment when the terminal device will perform the pre-scheduled service and a size of data to be transmitted for the pre-scheduled service.

Optionally, as an embodiment, the first configuration information is determined according to the service request message.

Optionally, as an embodiment, the first configuration information includes multiple pieces of indication information, any two of the multiple pieces of indication information indicate the time domain resource and the frequency domain resource for the terminal device to perform the pre-scheduled service in different indication manners, and the receiving module 710 is further configured to: receive scheduling information from the network device, the scheduling information indicating that the terminal device determines the time domain resource and the frequency domain resource used to perform the pre-scheduled service according to first indication information of the multiple pieces of indication information; and the performing module 720 is configured to determine the time domain resource and the frequency domain resource used to perform the pre-scheduled service according to the first indication information of the multiple pieces of indication information.

Figure 8:
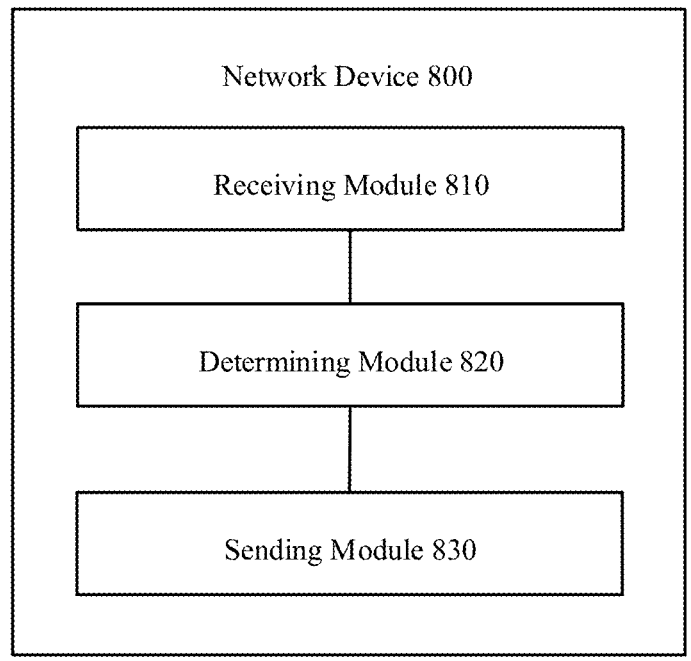
FIG. 8 is a schematic block diagram of a network device according to an embodiment of the present disclosure.

FIG. 8 is a schematic block diagram of a network device according to an embodiment of the present disclosure. The network device 800 as shown in FIG. 8 includes:

a receiving module 810 configured to receive a service request message from a terminal device, the service request message indicating a time moment when the terminal device will perform a pre-scheduled service and a size of data to be transmitted for the pre-scheduled service;

a determining module 820 configured to determine first configuration information according to the service request message, the first configuration information indicating a time domain resource and a frequency domain resource used by the terminal device to perform the pre-scheduled service; and a sending module 830 configured to send the first configuration information to the terminal device.

In the embodiment of the present disclosure, the network device can determine the time domain resource and the frequency domain resource used by the terminal device to perform the pre-scheduled service more reasonably according to the service request message sent by the terminal device, so that the terminal device can perform the pre-scheduled service in a more desirable way.

Optionally, as an embodiment, the pre-scheduled service is a periodic service, the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

Optionally, as an embodiment, the pre-scheduled service is a non-periodic service, the first configuration information indicates each time moment for the terminal device to perform the pre-scheduled service and the frequency domain resource used by the terminal device to perform the pre-scheduled service at each time moment, and the terminal device uses the same frequency domain resource to perform the pre-scheduled service at each time moment.

Optionally, as an embodiment, the first configuration information indicates each time moment for the terminal device to perform the pre-scheduled service and a respective frequency domain resource used by the terminal device to perform the pre-scheduled service at each time moment.

Optionally, as an embodiment, the sending module 830 is further configured to: send second configuration information to the terminal device, wherein the second configuration information is used for reconfiguring the terminal device to perform the pre-scheduling service using a second frequency domain resource at at least one second time moment instead of using a first frequency domain resource at at least one first time moment.

Optionally, as an embodiment, the first configuration information is sent by the sending module 830 through high layer signaling or physical layer signaling.

Optionally, as an embodiment, the first configuration information includes time domain resource indication information and frequency domain resource indication information, the time domain resource indication information is sent by the sending module 830 through the high layer signaling, and the frequency domain resource indication information is sent by the sending module 830 through the physical layer signaling.

Optionally, as an embodiment, the first configuration information includes multiple pieces of indication information, and any two of the multiple pieces of indication information indicate the time domain resource and the frequency domain resource for the terminal device to perform the pre-scheduled service in different indication manners, and the sending module 830 is further configured to: send scheduling information to the terminal device, the scheduling information indicating that the terminal device determines the time domain resource and the frequency domain resource used to perform the pre-scheduled service according to first indication information of the multiple pieces of indication information.

Figure 9:
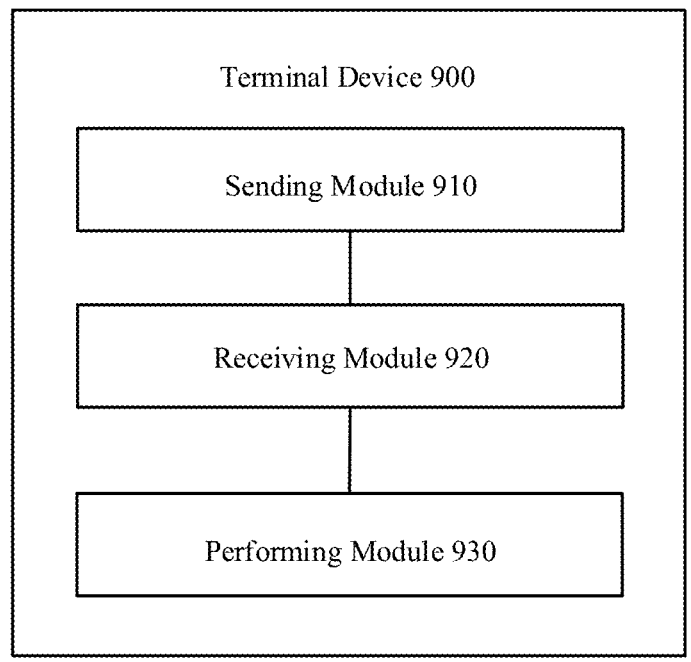
FIG. 9 is a schematic block diagram of a terminal device according to an embodiment of the present disclosure.

FIG. 9 is a schematic block diagram of a terminal device according to an embodiment of the present disclosure. The terminal device 900 as shown in FIG. 9 includes:

a sending module 910 configured to send a service request message to a network device, the service request message indicating a time moment when the terminal device will perform a pre-scheduled service and a size of data to be transmitted for a pre-scheduled service;

a receiving module 920 configured to receive first configuration information from the network device, the first configuration information indicating a time domain resource and a frequency domain resource used by the terminal device to perform the pre-scheduled service; and a performing module 930 configured to perform the pre-scheduled service on the time domain resource and the frequency domain resource indicated by the first configuration information.

In the embodiment of the present disclosure, the network device can determine the time domain resource and the frequency domain resource used by the terminal device to perform the pre-scheduled service more reasonably according to the service request message sent by the terminal device, so that the terminal device can perform the pre-scheduled service in a more desirable way.

Optionally, as an embodiment, the pre-scheduled service is a periodic service, the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

Optionally, as an embodiment, the pre-scheduled service is a non-periodic service, the first configuration information indicates each time moment for the terminal device to perform the pre-scheduled service and the frequency domain resource used by the terminal device to perform the pre-scheduled service at each of the time moments, and the terminal device uses the same frequency domain resource to perform the pre-scheduled service at each time moment.

Optionally, as an embodiment, the first configuration information indicates each time moment for the terminal device to perform the pre-scheduled service and a respective frequency domain resource used by the terminal device to perform the pre-scheduled service at each time moment.

Optionally, as an embodiment, the receiving module 920 is configured to: after receiving the first configuration information from the network device, receive second configuration information from the network device, wherein the second configuration information is used for reconfiguring the terminal device to perform the pre-scheduling service using a second frequency domain resource at at least one second time moment instead of using a first frequency domain resource at at least one first time moment.

Optionally, as an embodiment, the first configuration information is received by the receiving module 920 through high layer signaling or physical layer signaling.

Optionally, as an embodiment, the first configuration information includes time domain resource indication information and frequency domain resource indication information, the time domain resource indication information is received by the receiving module 920 through the high layer signaling, and the frequency domain resource indication information is received by the receiving module 920 through the physical layer signaling.

Optionally, as an embodiment, the first configuration information includes multiple pieces of indication information, any two of the multiple pieces of indication information indicate the time domain resource and the frequency domain resource for the terminal device to perform the pre-scheduled service in different indication manners, the receiving module 920 is further configured to: receive scheduling information from the network device, the scheduling information indicating that the terminal device determines the time domain resource and the frequency domain resource used to perform the pre-scheduled service according to first indication information of the multiple pieces of indication information; and the performing module 930 is configured to determine the time domain resource and the frequency domain resource used for performing the pre-scheduled service according to the first indication information in the scheduling information.

Figure 10:
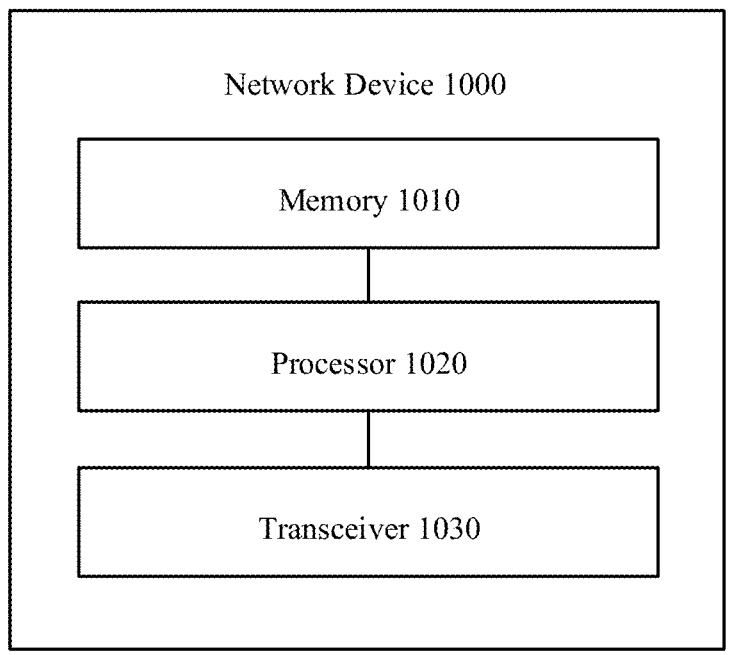
FIG. 10 is a schematic block diagram of a network device according to an embodiment of the present disclosure.

FIG. 10 is a schematic block diagram of a network device according to an embodiment of the present disclosure. The network device 1000 as shown in FIG. 10 includes a memory 1010, a processor 1020, and a transceiver 1030.

The memory 1010 is configured to store a program;

The processor 1020 is configured to execute the program. When the program is executed, the processor 1020 is configured to determine first configuration information. The first configuration information indicates a time domain resource and a frequency domain resource used by the terminal device to perform a pre-scheduled service.

The transceiver 1030 is configured to send the first configuration information to the terminal device.

In the embodiment of the present disclosure, the first configuration information is provided for indicating the time domain resource and the frequency domain resource used by the terminal device to perform the pre-scheduled service. As compared with the method of indicating only the transmission period and the frequency domain for the pre-scheduled service to be performed by the terminal device in the related art, the present disclosure can flexibly schedule the terminal device to perform pre-scheduled service.

Optionally, as an embodiment, the pre-scheduled service is a periodic service, and the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

Optionally, as an embodiment, the pre-scheduled service is a non-periodic service, and the first configuration information indicates each time moment for the terminal device to perform the pre-scheduled service and the frequency domain resource used by the terminal device to perform the pre-scheduled service at each of the time moments, and the terminal device uses the same frequency domain resource to perform the pre-scheduled service at each time moment.

Optionally, as an embodiment, the first configuration information indicates each time moment for the terminal device to perform the pre-scheduled service and a respective frequency domain resource used by the terminal device to perform the pre-scheduled service at each time moment.

Optionally, as an embodiment, the transceiver 1030 is configured to, after sending the first configuration information, send to the terminal device second configuration information, wherein the second configuration information is used for reconfiguring the terminal device to perform the pre-scheduling service using a second frequency domain resource at at least one second time moment instead of using a first frequency domain resource at at least one first time moment.

Optionally, as an embodiment, the first configuration information is sent by the transceiver 1030 through high layer signaling or physical layer signaling.

Optionally, as an embodiment, the first configuration information includes time domain resource indication information and frequency domain resource indication information, the time domain resource indication information is sent by the transceiver 1030 through the high layer signaling, and the frequency domain resource indication information is sent by the transceiver 1030 through the physical layer signaling.

Optionally, as an embodiment, the transceiver 1030 is further configured to receive a service request message from the terminal device, the service request message indicating a time moment when the terminal device will perform the pre-scheduled service and a size of data to be transmitted for the pre-scheduled service.

The processor 1020 is configured to determine the first configuration information according to the service request message.

Optionally, as an embodiment, the first configuration information includes multiple pieces of indication information, any two of the multiple pieces of indication information indicate the time domain resource and the frequency domain resource for the terminal device to perform the pre-scheduled service in different indication manners, and the transceiver 1030 is further configured to send scheduling information to the terminal device, the scheduling information indicating that the terminal device determines the time domain resource and the frequency domain resource used to perform the pre-scheduled service according to one of the multiple pieces of indication information.

Figure 11:
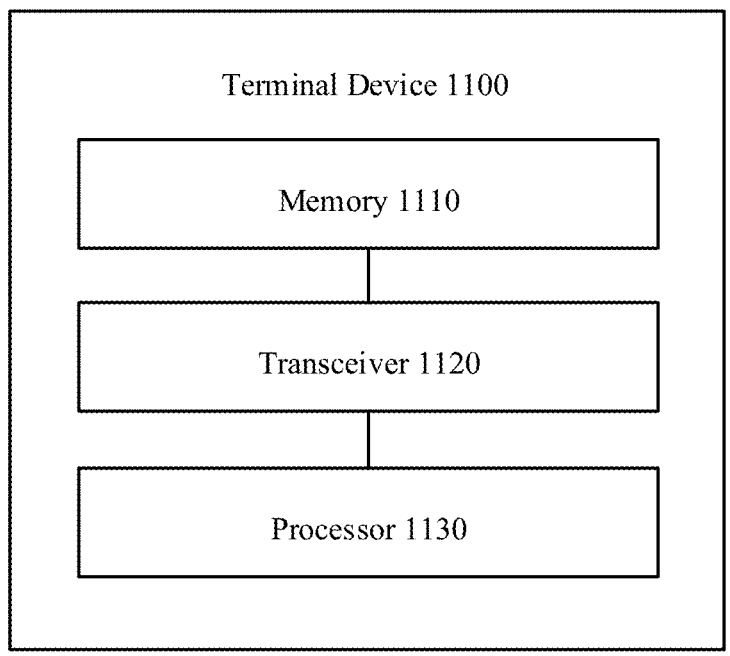
FIG. 11 is a schematic block diagram of a terminal device according to an embodiment of the present disclosure.

FIG. 11 is a schematic block diagram of a terminal device according to an embodiment of the present disclosure. The terminal device 1100 as shown in FIG. 11 includes a memory 1110, a transceiver 1120 and a processor 1130.

The memory 1110 is configured to store a program.

The transceiver 1120 is configured to receive first configuration information from a network device. The first configuration information indicates a time domain resource and a frequency domain resource used by the terminal device to perform a pre-scheduled service.

The processor 1130 is configured to execute the program. When the program is executed, the processor 1130 is configured to perform the pre-scheduled service on the time domain resource and the frequency domain resource indicated by the first configuration information.

In the embodiment of the present disclosure, the first configuration information is provided for indicating the time domain resource and the frequency domain resource used by the terminal device to perform the pre-scheduled service. As compared with the method of indicating only the transmission period and the frequency domain for the pre-scheduled service to be performed by the terminal device in the related art, it can flexibly schedule the terminal device to perform pre-scheduled service.

Optionally, as an embodiment, the pre-scheduled service is a periodic service, the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

Optionally, as an embodiment, the pre-scheduled service is a non-periodic service, and the first configuration information indicates each time moment for the terminal device to perform the pre-scheduled service and the frequency domain resource used by the terminal device to perform the pre-scheduled service at each time moment, and the terminal device uses the same frequency domain resource to perform the pre-scheduled service at each time moment.

Optionally, as an embodiment, the first configuration information indicates each time moment for the terminal device to perform the pre-scheduled service and a respective frequency domain resource used by the terminal device to perform the pre-scheduled service at each time moment.

Optionally, as an embodiment, the transceiver 1120 is further configured to, after receiving the first configuration information from the network device, receive second configuration information from the network device, and the performing module is configured to determine a time domain resource and a frequency domain resource used by the terminal device to perform the pre-scheduled service at a specified time moment according to the second configuration information.

Optionally, as an embodiment, the first configuration information is received by the transceiver 1120 through high layer signaling or physical layer signaling.

Optionally, as an embodiment, the first configuration information includes time domain resource indication information and frequency domain resource indication information, the time domain resource indication information is received by the transceiver 1120 through the high layer signaling, and the frequency domain resource indication information is received by the transceiver 1120 through the physical layer signaling.

Optionally, as an embodiment, the transceiver 1120 is configured to send a service request message to the network device, the service request message indicating a time moment when the terminal device will perform the pre-scheduled service and a size of data to be transmitted for the pre-scheduled service.

Optionally, as an embodiment, the first configuration information is determined according to the service request message.

Optionally, as an embodiment, the first configuration information includes multiple pieces of indication information, any two of the multiple pieces of indication information indicate the time domain resource and the frequency domain resource for the terminal device to perform the pre-scheduled service in different indication manners, and the transceiver 1120 is further configured to receive scheduling information from the network device, the scheduling information indicating that the terminal device determines the time domain resource and the frequency domain resource used to perform the pre-scheduled service according to first indication information of the multiple pieces of indication information; and the processor 1130 is configured to determine the time domain resource and the frequency domain resource used to perform the pre-scheduled service according to the first indication information of the multiple pieces of indication information.

Figure 12:
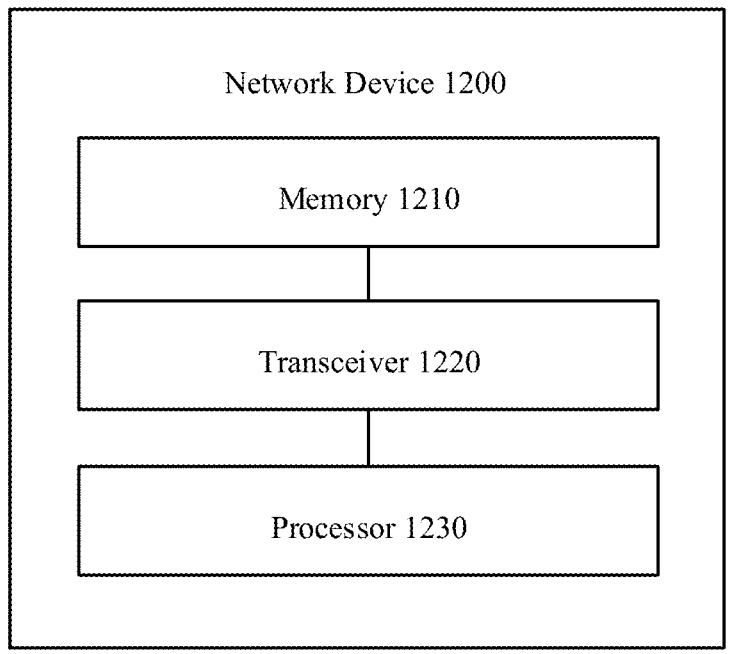
FIG. 12 is a schematic block diagram of a network device according to an embodiment of the present disclosure.

FIG. 12 is a schematic block diagram of a network device according to an embodiment of the present disclosure. The network device 1200 as shown in FIG. 12 includes a memory 1210, a transceiver 1220, and a processor 1230.

The memory 1210 is configured to store a program.

The transceiver 1220 configured to receive a service request message from the terminal device. The service request message indicates a time moment when the terminal device will perform a pre-scheduled service and a size of data to be transmitted for the pre-scheduled service.

The processor 1230 is configured to execute the program. When the program is executed, the processor 1230 is configured to determine first configuration information according to the service request message. The first configuration information indicates a time domain resource and a frequency domain resource used by the terminal device to perform the pre-scheduled service.

The transceiver 1220 is further configured to send the first configuration information to the terminal device.

In the embodiment of the present disclosure, the network device can determine the time domain resource and the frequency domain resource used by the terminal device to perform the pre-scheduled service more reasonably according to the service request message sent by the terminal device, so that the terminal device can perform the pre-scheduled service in a more desirable way.

Optionally, as an embodiment, the pre-scheduled service is a periodic service, the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

Optionally, as an embodiment, the pre-scheduled service is a non-periodic service, the first configuration information indicates each time moment for the terminal device to perform the pre-scheduled service and the frequency domain resource used by the terminal device to perform the pre-scheduled service at each time moment, and the terminal device uses the same frequency domain resource to perform the pre-scheduled service at each time moment.

Optionally, as an embodiment, the first configuration information indicates each time moment for the terminal device to perform the pre-scheduled service and a respective frequency domain resource used by the terminal device to perform the pre-scheduled service at each time moment.

Optionally, as an embodiment, after the network device sends the first configuration information to the terminal device, and the transceiver 1220 is further configured to send second configuration information to the terminal device, wherein the second configuration information is used for reconfiguring the terminal device to perform the pre-scheduling service using a second frequency domain resource at at least one second time moment instead of using a first frequency domain resource at at least one first time moment.

Optionally, as an embodiment, the first configuration information is sent by the transceiver 1220 through high layer signaling or physical layer signaling.

Optionally, as an embodiment, the first configuration information includes time domain resource indication information and frequency domain resource indication information, the time domain resource indication information is sent by the transceiver 1220 through the high layer signaling, and the frequency domain resource indication information is sent by the transceiver 1220 through the physical layer signaling.

Optionally, as an embodiment, the first configuration information includes multiple pieces of indication information, and any two of the multiple pieces of indication information indicate the time domain resource and the frequency domain resource for the terminal device to perform the pre-scheduled service in different indication manners, and the transceiver 1220 is further configured to send scheduling information to the terminal device, the scheduling information indicating that the terminal device determines the time domain resource and the frequency domain resource used to perform the pre-scheduled service according to first indication information of the multiple pieces of indication information.

Figure 13:
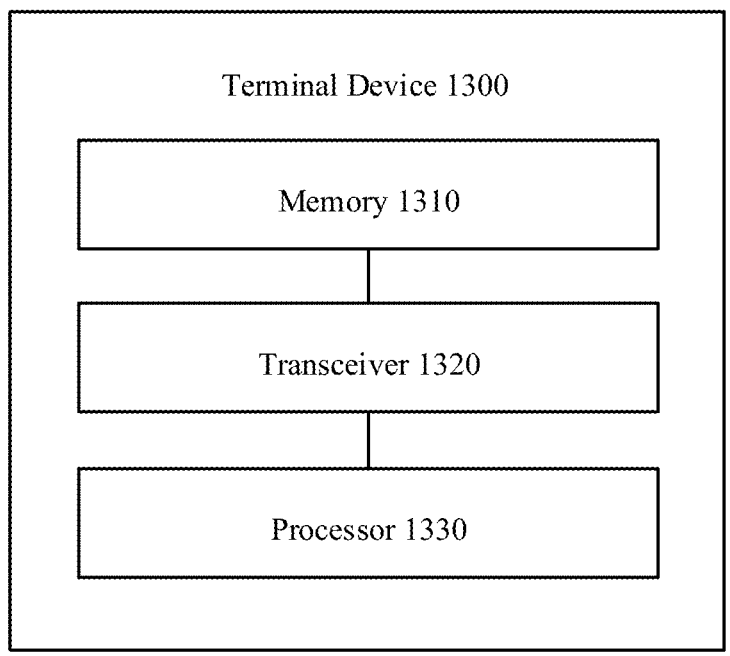
FIG. 13 is a schematic block diagram of a terminal device according to an embodiment of the present disclosure.

FIG. 13 is a schematic block diagram of a terminal device according to an embodiment of the present disclosure. The terminal device 1300 as shown in FIG. 13 includes a memory 1310, a transceiver 1320, and a processor 1330.

The memory 1310 is configured to store a program.

The transceiver 1320 is configured to send a service request message to a network device. The service request message indicates a time moment when the terminal device will perform a pre-scheduled service and a size of data to be transmitted for the pre-scheduled service.

The transceiver 1320 is further configured to receive first configuration information from the network device. The first configuration information indicates a time domain resource and a frequency domain resource used by the terminal device to perform the pre-scheduled service.

The processor 1330 is configured to execute the program. When the program is executed, the processor 1330 is configured to perform the pre-scheduled service on the time domain resource and the frequency domain resource indicated by the first configuration information.

In the embodiment of the present disclosure, the network device can determine the time domain resource and the frequency domain resource used by the terminal device to perform the pre-scheduled service more reasonably according to the service request message sent by the terminal device, so that the terminal device can perform the pre-scheduled service in a more desirable way.

Optionally, as an embodiment, the pre-scheduled service is a periodic service, the first configuration information indicates a transmission period of the pre-scheduled service and a frequency domain resource used by the terminal device to perform the pre-scheduled service at each of the time moments, and the terminal device uses different frequency domain resources to perform the pre-scheduled service at at least two of the time moments.

Optionally, as an embodiment, the pre-scheduled service is a non-periodic service, the first configuration information indicates each time moment for the terminal device to perform the pre-scheduled service and the frequency domain resource used by the terminal device to perform the pre-scheduled service at each of the time moments, and the terminal device uses the same frequency domain resource to perform the pre-scheduled service at each time moment.

Optionally, as an embodiment, the first configuration information indicates each time moment for the terminal device to perform the pre-scheduled service and a respective frequency domain resource used by the terminal device to perform the pre-scheduled service at each time moment.

Optionally, as an embodiment, the transceiver 1320 is configured to after receiving the first configuration information from the network device, receive second configuration information from the network device, wherein the second configuration information is used for reconfiguring the terminal device to perform the pre-scheduling service using a second frequency domain resource at at least one second time moment instead of using a first frequency domain resource at at least one first time moment.

Optionally, as an embodiment, the first configuration information is received by the transceiver 1320 through high layer signaling or physical layer signaling.

Optionally, as an embodiment, the first configuration information includes time domain resource indication information and frequency domain resource indication information, the time domain resource indication information is received by the transceiver 1320 through the high layer signaling, and the frequency domain resource indication information is received by the transceiver 1320 through the physical layer signaling.

Optionally, as an embodiment, the first configuration information includes multiple pieces of indication information, any two of the multiple pieces of indication information indicate the time domain resource and the frequency domain resource for the terminal device to perform the pre-scheduled service in different indication manners, and the transceiver 1320 is further configured to receive scheduling information from the network device, the scheduling information indicating that the terminal device determines the time domain resource and the frequency domain resource used to perform the pre-scheduled service according to first indication information of the multiple pieces of indication information; and the transceiver 1320 is configured to determine the time domain resource and the frequency domain resource used for performing the pre-scheduled service according to the first indication information in the scheduling information.

Figure 14:
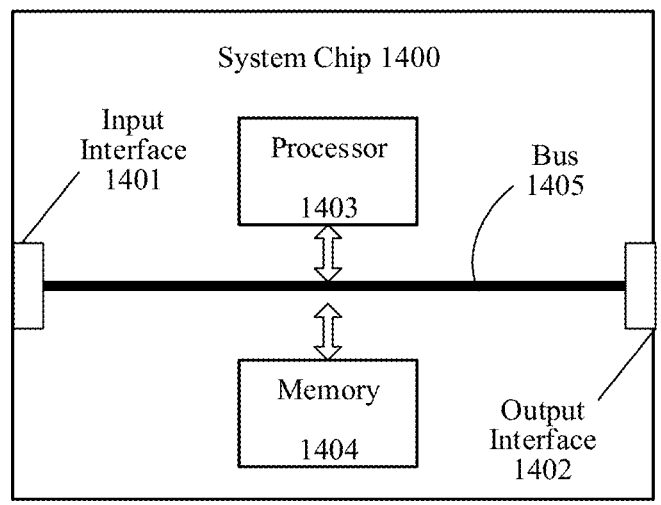
FIG. 14 is a schematic block diagram of a system chip according to an embodiment of the present disclosure.

FIG. 14 is a schematic block diagram of a system chip according to an embodiment of the present disclosure. The system chip 1400 of FIG. 14 includes a system chip, and the input interface 1401, an output interface 1402, the processor 1403, and a memory 1404, which are connected by a bus 1405. The processor 1403 is configured to execute codes in the memory 1404. When the codes are executed, the processor 1403 implements the method performed by the network device shown in FIG. 2.

Figure 15:
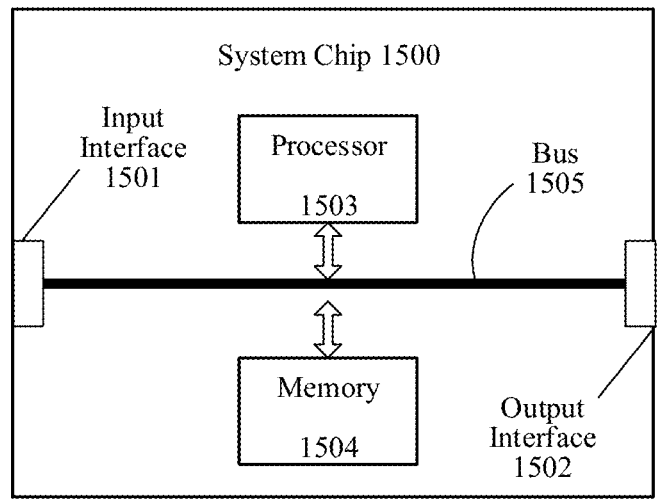
FIG. 15 is a schematic block diagram of a system chip according to an embodiment of the present disclosure.

FIG. 15 is a schematic block diagram of a system chip according to an embodiment of the present disclosure. The system chip 1500 of FIG. 15 includes a system chip, and the input interface 1501, an output interface 1502, the processor 1503, and a memory 1504, which are connected by a bus 1505. The processor 1503 is configured to execute codes in the memory 1504. When the codes are executed, the processor 1503 implements the method performed by the terminal device shown in FIG. 3.

Figure 16:
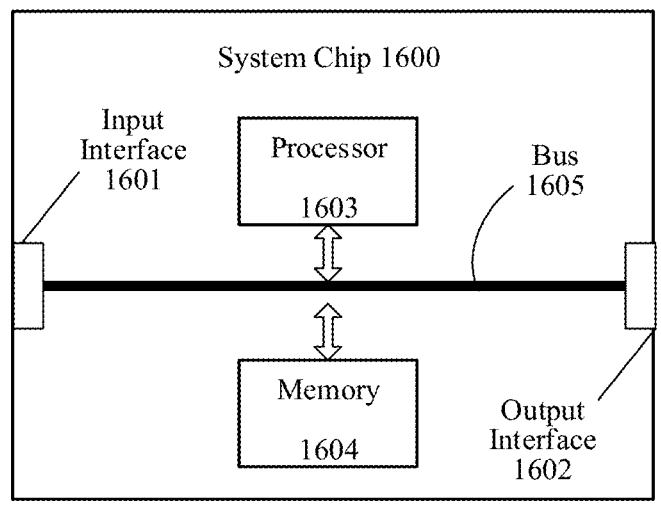
FIG. 16 is a schematic block diagram of a system chip according to an embodiment of the present disclosure.

FIG. 16 is a schematic block diagram of a system chip according to an embodiment of the present disclosure. The system chip 1600 of FIG. 16 includes a system chip, and the input interface 1601, an output interface 1602, the processor 1603, and a memory 1604, which are connected by a bus 1605. The processor 1603 is configured to execute codes in the memory 1604. When the codes are executed, the processor 1603 implements the method performed by the network device shown in FIG. 4.

Figure 17:
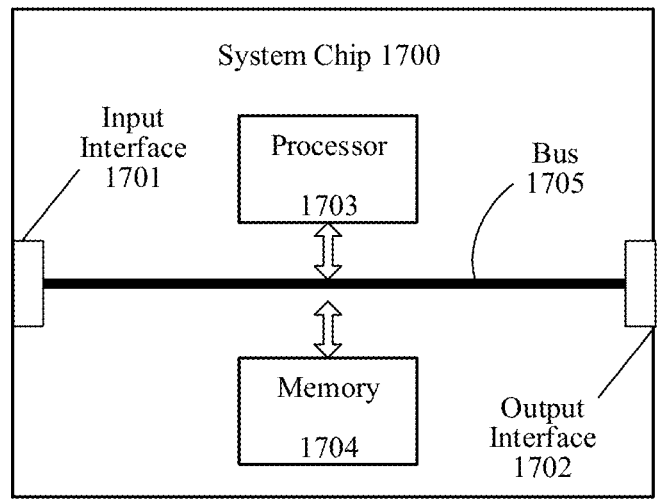
FIG. 17 is a schematic block diagram of a system chip according to an embodiment of the present disclosure.

FIG. 17 is a schematic block diagram of a system chip according to an embodiment of the present disclosure. The system chip 1700 of FIG. 17 includes a system chip, and the input interface 1701, an output interface 1702, the processor 1703, and a memory 1704, which are connected by a bus 1705. The processor 1703 is configured to execute codes in the memory 1704. When the codes are executed, the processor 1703 implements the method performed by the terminal device shown in FIG. 5.

Those of ordinary skill in the art will appreciate that the elements and algorithm steps of the various examples described in connection with the embodiments disclosed herein can be implemented in electronic hardware or a combination of computer software and electronic hardware. Whether these functions are implemented in hardware or software depends on the specific application and design constraints of the technical solution. A person skilled in the art can use different methods for implementing the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the several embodiments provided by the present disclosure, it should be understood that the disclosed systems, devices, and methods may be implemented in other manners. For example, the device embodiments described above are merely illustrative. For example, the division of the unit is only a logical function division. In actual implementation, there may be another division manner, for example, multiple units or components may be combined or can be integrated into another system, or some features can be ignored or not executed. In addition, the coupling or direct coupling or communication connection shown or discussed herein may be an indirect coupling or communication connection through some interface, device or unit, and may be electrical, mechanical or otherwise.

The units described as separate components may or may not be physically separated, and the components displayed as units may or may not be physical units, that is, may be located in one place, or may be distributed across multiple network units. Some or all of the units may be selected according to actual needs to achieve the purpose of the technical solution of the embodiment.

In addition, each functional unit in each embodiment of the present disclosure may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present disclosure in essential, or a part thereof contributing to the prior art, or a part thereof may be embodied in the form of a software product, which is stored in a storage medium, including instructions causing a computer device (which may be a personal computer, server, or network device, etc.) to perform all or part of the steps of the methods described in various embodiments of the present disclosure.

The storage medium includes: a U disk, a mobile hard disk, a read-only memory (ROM), a random access memory (RAM), a magnetic disk, or an optical disk, and the like, which can store program codes.

The above is only the exemplary embodiments of the present disclosure, but the scope of the present disclosure is not limited thereto, and any person skilled in the art can easily conceive modifications or substitutions within the technical scope of the present disclosure. It should be covered by the scope of the present disclosure. Therefore, the scope of the present disclosure should be defined by the scope of the appended claims.

What is claimed is:

1. A method for scheduling a terminal device, comprising:
   determining, by a network device, first configuration information, the first configuration information indicating each time moment for the terminal device to perform a pre-scheduled service and a respective frequency domain resource used by the terminal device to perform the pre-scheduled service at each time moment; and
   sending, by the network device, the first configuration information to the terminal device;
   wherein the pre-scheduled service is a periodic service, and the terminal device uses different frequency domain resources to perform the pre-scheduled service at at least two of the time moments;
   wherein frequency domain resources used by the terminal device to perform the pre-scheduled service are periodically cycled.

2. The method according to claim 1, wherein the first configuration information is sent by the network device through high layer signaling or physical layer signaling.

3. The method according to claim 2, wherein the first configuration information comprises time domain periodicity indication information and frequency domain resource indication information, the time domain periodicity indication information is sent by the network device through the high layer signaling, and the frequency domain resource indication information is sent by the network device through the physical layer signaling.

4. The method for scheduling a terminal device according to claim 1, further comprising:
   receiving, by a network device, a service request message from the terminal device, the service request message indicating a time moment when the terminal device will perform a pre-scheduled service and a size of data to be transmitted for the pre-scheduled service;
   wherein the first configuration information is determined according to the service request message.

5. The method according to claim 4, wherein the first configuration information is sent by the network device through high layer signaling or physical layer signaling.

6. The method according to claim 5, wherein the first configuration information comprises time domain periodicity indication information and frequency domain resource indication information, the time domain periodicity indication information is sent by the network device through the high layer signaling, and the frequency domain resource indication information is sent by the network device through the physical layer signaling.

7. A method for scheduling a terminal device, comprising:
   receiving, by the terminal device, first configuration information from a network device, the first configuration information indicating each time moment for the terminal device to perform a pre-scheduled service and a respective frequency domain resource used by the terminal device to perform the pre-scheduled service at each time moment; and
   performing, by the terminal device, the pre-scheduled service on the time domain resource and the frequency domain resource indicated by the first configuration information;
   wherein the pre-scheduled service is a periodic service, a periodic service, and the terminal device uses different frequency domain resources to perform the pre-scheduled service at at least two of the time moments;
   wherein frequency domain resources used by the terminal device to perform the pre-scheduled service are periodically cycled.

8. The method according to claim 7, wherein the first configuration information is received by the terminal device through high layer signaling or physical layer signaling.

9. The method according to claim 8, wherein the first configuration information comprises time domain periodicity indication information and frequency domain resource indication information, the time domain periodicity indication information is received by the terminal device through the high layer signaling, and the frequency domain resource indication information is received by the terminal device through the physical layer signaling.

10. The method for scheduling a terminal device according to claim 7, further comprising:
    sending, by the terminal device, a service request message to a network device, the service request message indicating a time moment when the terminal device will perform a pre-scheduled service and a size of data to be transmitted for the pre-scheduled service.

11. The method according to claim 10, wherein the first configuration information is determined according to the service request message.

12. The method according to claim 10, wherein the first configuration information is received by the terminal device through high layer signaling or physical layer signaling.

13. The method according to claim 12, wherein the first configuration information comprises time domain periodicity indication information and frequency domain resource indication information, the time domain periodicity indication information is received by the terminal device through the high layer signaling, and the frequency domain resource indication information is received by the terminal device through the physical layer signaling.

14. A network device, comprising:
    a memory;
    a transceiver; and
    a processor;
    wherein the memory is configured to store a program, the processor is configured to execute the program, and when the program is executed, the processor is caused to determine first configuration information, the first configuration information indicating each time moment for a terminal device to perform the pre-scheduled service and a respective frequency domain resource used by the terminal device to perform a pre-scheduled service at each time moment;
    wherein the transceiver is configured to send the first configuration information to the terminal device;
    wherein the pre-scheduled service is a periodic service, a periodic service, and the terminal device uses different frequency domain resources to perform the pre-scheduled service at at least two of the time moments;

wherein frequency domain resources used by the terminal device to perform the pre-scheduled service are periodically cycled.

15. The network device according to claim 14, wherein the first configuration information is sent by the transceiver through high layer signaling or physical layer signaling.

16. The network device according to claim 15, wherein the first configuration information comprises time domain periodicity indication information and frequency domain resource indication information, the time domain periodicity indication information is sent by the transceiver through the high layer signaling, and the frequency domain resource indication information is sent by the transceiver through the physical layer signaling.

17. The network device according to claim 14,
wherein the transceiver is caused to receive a service request message from a terminal device, the service request message indicating a time moment when the terminal device will perform a pre-scheduled service and a size of data to be transmitted for the pre-scheduled service, and the processor is configured to determine first configuration information according to the service request message.

18. The network device according to claim 17, wherein the first configuration information is sent by the transceiver through high layer signaling or physical layer signaling.

19. The network device according to claim 18, wherein the first configuration information comprises time domain periodicity indication information and frequency domain resource indication information, the time domain periodicity indication information is sent by the transceiver through the high layer signaling, and the frequency domain resource indication information is sent by the transceiver through the physical layer signaling.

20. A terminal device, comprising:
a memory;
a transceiver; and
a processor;
wherein the memory is configured to store a program, the processor is configured to execute the program, and when the program is executed, the transceiver is configured to receive first configuration information from a network device, the first configuration information indicating each time moment for the terminal device to perform a pre-scheduled service and a respective frequency domain resource used by the terminal device to perform the pre-scheduled service at each time moment, and the processor is configured to perform the pre-scheduled service on the time domain resource and the frequency domain resource indicated by the first configuration information;
wherein the pre-scheduled service is a periodic service, a periodic service, and the terminal device uses different frequency domain resources to perform the pre-scheduled service at at least two of the time moments;
wherein frequency domain resources used by the terminal device to perform the pre-scheduled service are periodically cycled.

21. The terminal device according to claim 20, wherein the first configuration information is received by the transceiver through high layer signaling or physical layer signaling.

22. The terminal device according to claim 21, wherein the first configuration information comprises time domain periodicity indication information and frequency domain resource indication information, the time domain periodicity indication information is received by the transceiver through the high layer signaling, and the frequency domain resource indication information is received by the transceiver through the physical layer signaling.

23. The terminal device according to claim 20,
wherein the transceiver is caused to send a service request message to a network device, the service request message indicating a time moment when the terminal device will perform a pre-scheduled service and a size of data to be transmitted for a pre-scheduled service.

24. The terminal device according to claim 23, wherein the first configuration information is received by the transceiver through high layer signaling or physical layer signaling.

25. The terminal device according to claim 24, wherein the first configuration information comprises time domain periodicity indication information and frequency domain resource indication information, the time domain periodicity indication information is received by the transceiver through the high layer signaling, and the frequency domain resource indication information is received by the transceiver through the physical layer signaling.

* * * * *